(12) United States Patent
Takada et al.

(10) Patent No.: US 10,432,421 B2
(45) Date of Patent: Oct. 1, 2019

(54) COMMUNICATION CONTROL DEVICE AND COMMUNICATION SYSTEM

(71) Applicants: National University Corporation Nagoya University, Nagoya-shi, Aichi (JP); AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

(72) Inventors: Hiroaki Takada, Nagoya (JP); Ryo Kurachi, Nagoya (JP); Naoki Adachi, Yokkaichi (JP)

(73) Assignees: National University Corporation Nagoya University, Nagoya-Shi, Aichi (JP); AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 100 days.

(21) Appl. No.: 15/527,826

(22) PCT Filed: Nov. 18, 2015

(86) PCT No.: PCT/JP2015/082349
§ 371 (c)(1),
(2) Date: May 18, 2017

(87) PCT Pub. No.: WO2016/080422
PCT Pub. Date: May 26, 2016

(65) Prior Publication Data
US 2017/0324579 A1 Nov. 9, 2017

(30) Foreign Application Priority Data
Nov. 20, 2014 (JP) .................. 2014-235782

(51) Int. Cl.
*H04L 12/40* (2006.01)

(52) U.S. Cl.
CPC .. *H04L 12/40163* (2013.01); *H04L 12/40052* (2013.01); *H04L 12/40156* (2013.01); *H04L 2012/40215* (2013.01)

(58) Field of Classification Search
CPC ......... H04L 12/40163; H04L 12/40052; H04L 12/40156; H04L 2012/40215
See application file for complete search history.

(56) References Cited

U.S. PATENT DOCUMENTS

2005/0289648 A1* 12/2005 Grobman ............ H04L 63/0281
726/12
2006/0171362 A1* 8/2006 Garg ................ H04W 72/1263
370/338

(Continued)

FOREIGN PATENT DOCUMENTS

| JP | 2013-038711 A | 2/2013 |
| JP | 2014-146868 A | 8/2014 |
| WO | 2013/094072 A1 | 6/2013 |

OTHER PUBLICATIONS

Search Report for International Application No. PCT/JP2015/082349, dated Dec. 28, 2015, 2 pp.

*Primary Examiner* — Chirag G Shah
*Assistant Examiner* — Joshua Smith
(74) *Attorney, Agent, or Firm* — Honigman LLP

(57) ABSTRACT

Provided are a communication control device and a communication system capable of detecting message transmission in the case where an invalid device transmits a message to a common communication line. A monitoring device decides a reference time point t0 for periodical message transmission by an ECU, decides multiple scheduled transmission time points t1, t2, . . . obtained by adding a period corresponding to an integer multiple of a transmission cycle (Continued)

T of a message to the reference time point t0, and decides that a predetermined period including each of the scheduled transmission time points is a permission period for message transmission. The monitoring device determines whether or not a detected message on a CAN bus has been transmitted during the permission period. If determined that transmission of an invalid message is not permitted, the monitoring device performs processing of causing the ECU which receives the message to discard the message.

14 Claims, 17 Drawing Sheets

(56) References Cited

U.S. PATENT DOCUMENTS

| | | | |
|---|---|---|---|
| 2007/0019543 A1* | 1/2007 | Wei | H04L 63/1458 370/229 |
| 2008/0032717 A1* | 2/2008 | Sawada | H04L 29/1215 455/466 |
| 2011/0188431 A1* | 8/2011 | Krueger | H04W 52/286 370/311 |
| 2014/0328352 A1 | 11/2014 | Mabuchi et al. | |
| 2015/0223069 A1* | 8/2015 | Solondz | H04W 12/08 370/329 |
| 2015/0358351 A1 | 12/2015 | Otsuka et al. | |
| 2016/0337334 A1* | 11/2016 | Murr | H04W 12/06 |

* cited by examiner

FIG. 4

COPY DATA

| IDENTIFICATION INFORMATION | CONTENT |
|---|---|
| ECUa | ...... |
| ECUb | ...... |
| ⋮ | ⋮ |

FIG. 5

CYCLE INFORMATION

| CAN-ID | CYCLE |
|--------|-------|
| 1 | 10ms |
| 2 | 50ms |
| 3 | 32ms |
| ⋮ | ⋮ |

COMMUNICATION CONTROL DEVICE AND COMMUNICATION SYSTEM

CROSS-REFERENCE TO RELATED APPLICATIONS

This application is the national phase under 35 U.S.C. § 371 of PCT International Application No. PCT/JP2015/082349 which has an International filing date of Nov. 18, 2015 and claims priority to Japanese Application No. 2014-235782 filed on Nov. 20, 2014.

FIELD

The present disclosure relates to a communication system in which multiple communication devices transmit and receive messages such as a controller area network (CAN) for example, and to a communication control device detecting invasion of the system by an invalid message.

BACKGROUND

Conventionally, the CAN communication protocol has widely been employed in communication between multiple electronic control units (ECU) mounted in a vehicle. A communication system employing the CAN communication protocol is so configured that multiple ECUs are connected to a common CAN bus, and transmission and reception of messages are performed by an ECU at the reception side obtaining a signal output by an ECU at the transmission side to the CAN bus.

In such a communication system, technology has been studied for detecting or preventing invasion of an invalid message onto a common communication line.

Japanese Patent Application Laid-Open Publication No. 2013-38711 has proposed a communication management device for a vehicle network which restricts the input of external data. The communication management device monitors data on a CAN bus as well as data input from the outside, and if the activity rate of the CAN bus exceeds a load reference value or is predicted to exceed the load reference value along with the transfer of external data, executes transmission control of external data.

It is possible in a vehicle-mounted communication system that, for example, a malicious device is connected to the CAN bus. Such a device may, for example, transmit an invalid message to the CAN bus to cause a normal ECU or the like connected to the CAN bus to malfunction. Since the communication management device described in Japanese Patent Application Laid-Open Publication No. 2013-38711 is configured to determine whether or not the activity rate of the CAN bus exceeds the load reference value, a problem arises in that transmission control cannot be carried out in the case where the amount of message transmission by a malicious device is small.

SUMMARY

The present disclosure has been made in view of the above circumstances, and aims to provide a communication control device and a communication system capable of detecting any message transmitted by an invalid device to a common communication line.

A communication control device according to an aspect of the present disclosure controlling communication performed by a communication device including a message transmission part periodically transmitting messages comprises: a reference time point decision part deciding a reference time point concerning message transmission by the message transmission part; a permission period decision part setting, as a permission period, a predetermined time period including a scheduled transmission time point obtained by adding a period corresponding to an integer multiple of a cycle of message transmission by the message transmission part to the reference time point decided by the reference time point decision part; a message detection part detecting a message transmitted by the communication device; and a transmittability determination part determining transmittability of the message in accordance with whether or not the message detected by the message detection part has been transmitted during the permission period decided by the permission period decision part.

Moreover, in the communication control device according to another aspect of the present disclosure, in a case where a plurality of communication devices to be controlled are present, the reference time point decision part and the permission period decision part are to decide the reference time point and the permission period for each of the plurality of communication devices.

Moreover, in the communication control device according to another aspect of the present disclosure, the message transmitted by the communication device includes information indicating a priority level of the message, and the permission period decision part is configured to decide the permission period for each priority level of the message.

Moreover, the communication control device according to another aspect of the present disclosure, comprising arbitration unit arbitrating a transmission order according priority levels respectively determined for messages transmitted by a plurality of communication devices if the messages collide against each other, wherein the transmittability determination part is configured to inspect a priority level of a message completed to be transmitted in a period from the scheduled transmission time point related to a determination target message to completion of transmission of the determination target message, and to determine that transmission of the determination target message is not permitted if a message with a priority level lower than a priority level of the determination target message is present.

Moreover, in the communication control device according to another aspect of the present disclosure, the transmittability determination part is configured to determine, if a message non-transmission period exceeding a predetermined length is present in a period from the scheduled transmission time point related to a determination target message to completion of transmission of the determination target message, that transmission of the determination target message is not permitted.

Moreover, the communication control device according to another aspect of the present disclosure, comprising: a hash value request part sending a calculation request for a hash value to the communication device; a hash value reception part receiving a hash value transmitted by the communication device as a response to the calculation request; and a hash value determination part determining whether or not the hash value received by the hash value reception part is correct, wherein the reference time point decision part is configured to decide the reference time point based on a time point when reception of a correct hash value from the communication device is completed.

Moreover, the communication control device according to another aspect of the present disclosure, comprising a discard processing part performing processing of causing the communication device, receiving a message determined by the transmittability determination part that transmission of the message is not permitted, to discard the message.

Moreover, a communication system according to an aspect of the present disclosure, comprising a plurality of communication devices transmitting and receiving messages to/from each other, and a communication control device controlling communication performed by the communication devices, wherein each communication device includes a message transmission part periodically transmitting messages, and the communication control device includes: a reference time point decision part deciding a reference time point concerning message transmission by the message transmission part; a permission period decision part deciding that a predetermined period including a scheduled transmission time point obtained by adding a period corresponding to an integer multiple of a cycle of message transmission by the message transmission part to the reference time point decided by the reference time point decision part is a permission period for message transmission; a message detection part detecting the message transmitted by a communication device; and a transmittability determination part determining transmittability of a message detected by the message detection part in accordance with whether or not the message is transmitted during the permission period decided by the permission period decision part.

Moreover, in the communication system according to another aspect of the present disclosure, the reference time point decision part and the permission period decision part are configured to decide the reference time point and the permission period for each of the plurality of communication devices.

Moreover, in the communication system according to another aspect of the present disclosure, the message transmitted by the plurality of communication devices includes information indicating a priority level of the message, and the permission period decision part is configured to decide the permission period for each priority level of the message.

Moreover, the communication system according to another aspect of the present disclosure, comprising arbitration unit arbitrating a transmission order according priority levels respectively determined for messages transmitted by the plurality of communication devices if the messages collide against each other, wherein the transmittability determination part is configured to inspect a priority level of a message completed to be transmitted in a period from the scheduled transmission time point related to a determination target message to completion of transmission of the determination target message, and to determine that transmission of the determination target message is not permitted if a message with a priority level lower than a priority level of the determination target message is present.

Moreover, in the communication system according to another aspect of the present disclosure, the transmittability determination part is configured to determine, if a message non-transmission period exceeding a predetermined length is present in a period from the scheduled transmission time point related to a determination target message to completion of transmission of the determination target message, that transmission of the determination target message is not permitted.

Moreover, in the communication system according to another aspect of the present disclosure, the communication control device includes: a hash value request part sending a calculation request for a hash value to a communication device; a hash value reception part receiving a hash value transmitted by the communication device as a response to the calculation request; and a hash value determination part determining whether or not the hash value received by the hash value reception part is correct, wherein each communication device includes: a hash value calculation part calculating a hash value in accordance with a calculation request from the communication control device; and a hash value transmission part transmitting the hash value calculated by the hash value calculation part to the communication control device, and wherein the reference time point decision part is configured to decide the reference time point based on a time point when reception of a correct hash value from the communication device is completed.

Moreover, in the communication system according to another aspect of the present disclosure, the message transmission part is configured to decide a reference time point based on the time point when transmission of a correct hash value from the hash value transmission part is completed, and to periodically transmit messages with the decided time point set as a reference.

Moreover, in the communication system according to another aspect of the present disclosure, the communication control device includes a discard processing part performing processing of causing a communication device, receiving a message determined by the transmittability determination part that transmission of the message is not permitted, to discard the message.

According to an aspect of the present disclosure, the communication system, having a configuration in which a plurality of communication devices are connected to a common communication line and each of the communication devices periodically transmits messages, is provided with a communication control device detecting invalid message transmission. The communication control device decides a reference time point (t0) for periodical message transmission by the communication device, decides multiple time points, each obtained by adding a period corresponding to an integer multiple (n=1, 2, 3, . . . ) of the transmission cycle (T) of messages to the reference time point (t0), as scheduled transmission time points (t1=t0+T, t2=t0+2T, t3=t0+3T, . . . , tn=t0+nT), and decides a predetermined period including each of the scheduled time points (t1, t2, t3, . . . tn) as a permission period (t1−A to t1+B, t2−A to t2+B, t3−A to t3+B, . . . , tn−A to tn+B) for message transmission.

Furthermore, the communication control device monitors a common communication line to detect a message transmitted by a communication device. By determining whether or not the detected message has been transmitted during the permission period described above, the communication control device may determine whether or not this message is invalid and determine whether or not transmission of this message is permitted.

As described above, the communication control device according to an aspect of the present disclosure is configured to decide a permission period for the subsequent message transmission, i.e., configured to decide a permission period on an absolute basis, based on the reference time point decided at the initial stage. In contrast, such a configuration may also be employed that a predetermined period including a time point obtained by adding the cycle T to the reception time point of the message is set as a permission period, i.e., that the permission period is decided on a relative basis. In the CAN communication protocol, however, arbitration processing is performed if collision occurs in message transmission, and thus a delay may be caused in the transmission of a message having a low priority level. In the configuration of making a decision on the relative basis, it is necessary to elongate a permission period to some extent because the permission period for determination varies if a delay occurs in message transmission, and therefore it is difficult to shorten the permission period. As the permission period is elongated, it is more likely to misjudge the validity of an invalid message. Moreover, in the configuration of making a decision on the relative basis, the permission period for the next message may be decided on the basis of the reception of an invalid message. If such a situation occurs, it is possible that invalid messages are sequentially misjudged as valid messages. The communication control device according to the present disclosure is able to avoid the occurrence of these problems by deciding a permission period on the absolute basis.

According to another aspect of the present disclosure, the communication control device decides the reference time point individually for each communication device included in the communication system. Moreover, the communication control device decides a permission period for each communication device with respect to its decided reference time point. The message transmission cycle of the communication control device may be different for each communication device. Thus, even in the case where communication devices having different transmission cycles and transmission timings of messages are included in the communication system, the communication control device may determine the transmittability of a message for each communication device.

According to another aspect of the present disclosure, the communication device may transmit different types of messages with different transmission cycles, and the communication control device decides a permission period for each type of message. It is noted that the communication control device may also decide a reference time point for each type of message. Thus, even if one communication device transmits messages having different transmission cycles, the communication control device may determine the transmittability for each type of message.

According to another aspect of the present disclosure, multiple communication devices are connected to the common communication line, which may cause multiple messages to collide against each other on the communication line if the communication devices simultaneously transmit messages. In such a case, arbitration processing is performed between the communication devices, and the messages are transmitted in the order according to their priority levels. That is, among the collided messages, a message with a high priority level is transmitted first and then a message with a low priority level is transmitted.

In the communication system performing such arbitration processing, a message to be periodically transmitted by the communication device may collide against another message and be delayed. The communication control device therefore inspects, for a message to be determined (also referred to as a determination target message or target message), whether or not a different message has been transmitted in a period from the scheduled transmission time point to the completion of the message transmission. In the case where a different message has been transmitted, the communication control device compares the priority level of the determination target message with the priority level of the different message.

If the priority level of the different message is higher than the priority level of the target message, it is possible that a delay occurs in transmission of the target message due to proper arbitration processing, and thus the communication control device permits transmission of the target message. In contrast, if the priority level of the different message is lower than the priority level of the target message, it is assumed that the delay of the target message is not caused by proper arbitration processing, so that the communication control device will not permit transmission of the target message. Accordingly, even in the communication system where a delay occurs in message transmission due to arbitration processing, the communication control device may determine the transmittability of a message.

According to another aspect of the present disclosure, the communication control device determines whether or not a message non-transmission period exceeding a predetermined length is present in a period from a scheduled transmission time point of the target message to the completion of transmission of the message. If the message non-transmission period is present, it is assumed that the delay of the target message is not caused by proper arbitration processing, so that the communication control device will not permit transmission of the target message.

According to another aspect of the present disclosure, a predetermined procedure is performed between the communication control device and the communication device in order to decide the reference time point. The communication control device transmits a calculation request for a hash value to the communication device. Here, the communication control device may send information necessary to calculate a hash value together with a calculation request. The communication device which received a calculation request from the communication control device calculates a hash value using a predetermined hash function based on the information stored in its own memory, and transmits the calculated hash value to the communication control device. The communication control device which received the hash value from the communication device determines whether or not the hash value is correct. If the received hash value is correct, the communication control device decides a reference time point based on the time point when the reception of the hash value is completed. The communication device may set the time point when the reception of the correct hash value is completed as a reference time point, or may set the time point obtained by adding or subtracting a predetermined time period to/from the time point when the reception is completed as the reference time point.

Likewise, the communication device decides the reference time point based on the time point when the transmission of the correct hash value is completed, and periodically transmits messages with the decided time point set as the reference.

Since the reference time point may be decided based on a highly reliable communication result on the basis of the hash value, the communication control device may detect an invalid message with high reliability.

According to another aspect of the present disclosure, as for the message determined as invalid and thus not permitted for the transmission thereof by the communication control device, the communication control device performs the processing of causing the communication device which receives the message to discard the message. This can prevent the communication device from receiving an invalid message and performing processing according to the message.

According to an aspect of the present disclosure, the communication control device is configured to decide a permission period including the time point obtained by adding a period corresponding to an integer multiple of the message transmission period to the reference time point, and to determine whether or not the message transmitted by the communication device is present within the permission period. Thus, a message transmitted by an invalid device to a common communication line may precisely be detected.

The above and further objects and features will more fully be apparent from the following detailed description with accompanying drawings.

BRIEF DESCRIPTION OF THE DRAWINGS

FIG. 4 is a schematic view illustrating the configuration of copy data stored in a storage unit of the monitoring device.

FIG. 5 is a schematic view illustrating the configuration of cycle information stored in a storage unit of the monitoring device.

DETAILED DESCRIPTION

<System Configuration>

Figure 1:
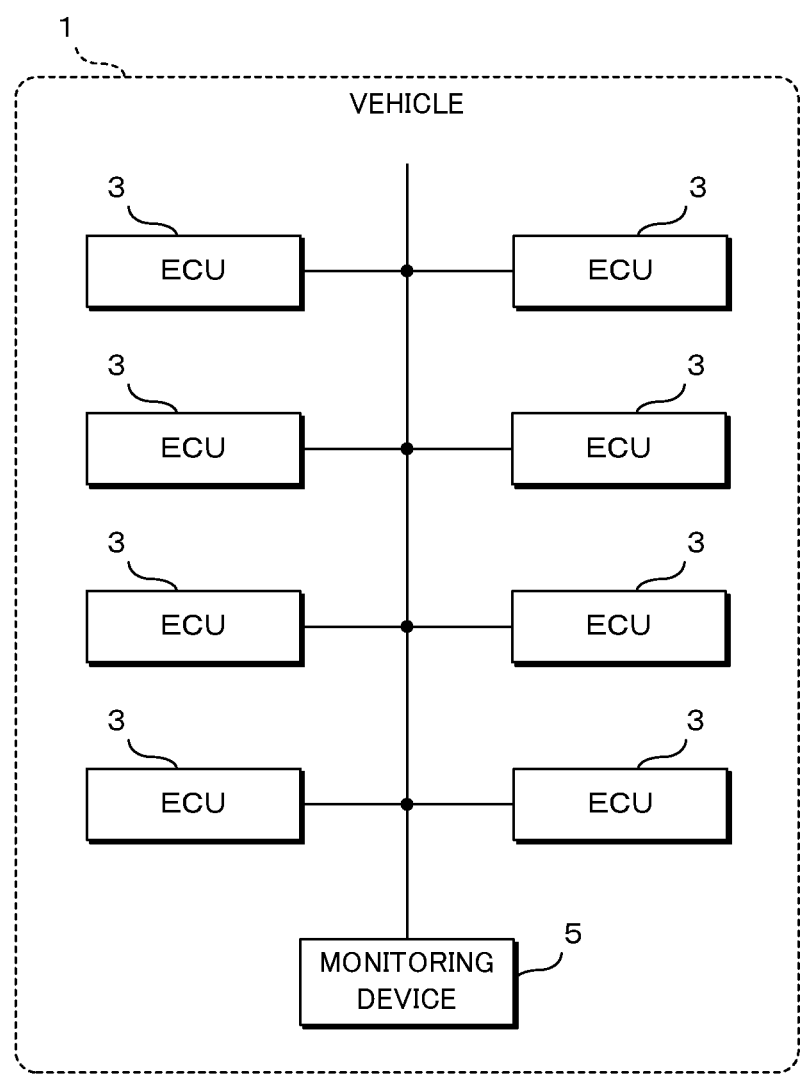
FIG. 1 is a schematic diagram illustrating the configuration of a communication system according to an embodiment of the present disclosure.

FIG. 1 is a schematic diagram illustrating the configuration of a communication system according to an embodiment of the present disclosure. The communication system according to the present embodiment is configured to include multiple ECUs 3 mounted to the vehicle 1 and one monitoring device 5. The ECUs 3 and the monitoring device 5 are connected with one another via a common communication line installed in the vehicle 1, and can transmit and receive messages to/from one another. According to the present embodiment, a CAN bus is employed as the communication line, and the ECUs 3 and monitoring device 5 perform communication according to the CAN protocol. The ECUs 3 may be, for example, various electronic control devices such as an engine ECU controlling the engine of the vehicle 1, a body ECU controlling an electric component of a vehicle body, an ABS-ECU performing control related to an antilock brake system (ABS) or an air bag ECU controlling an air bag of the vehicle 1. The monitoring device 5 is a device for monitoring invalid message transmission to an in-vehicle network. The monitoring device 5 may be provided as a device dedicated for monitoring, or configured with a monitoring function added to a device such as a gateway for example, or configured with a monitoring function added to any one of the ECUs 3, for example.

Figure 2:
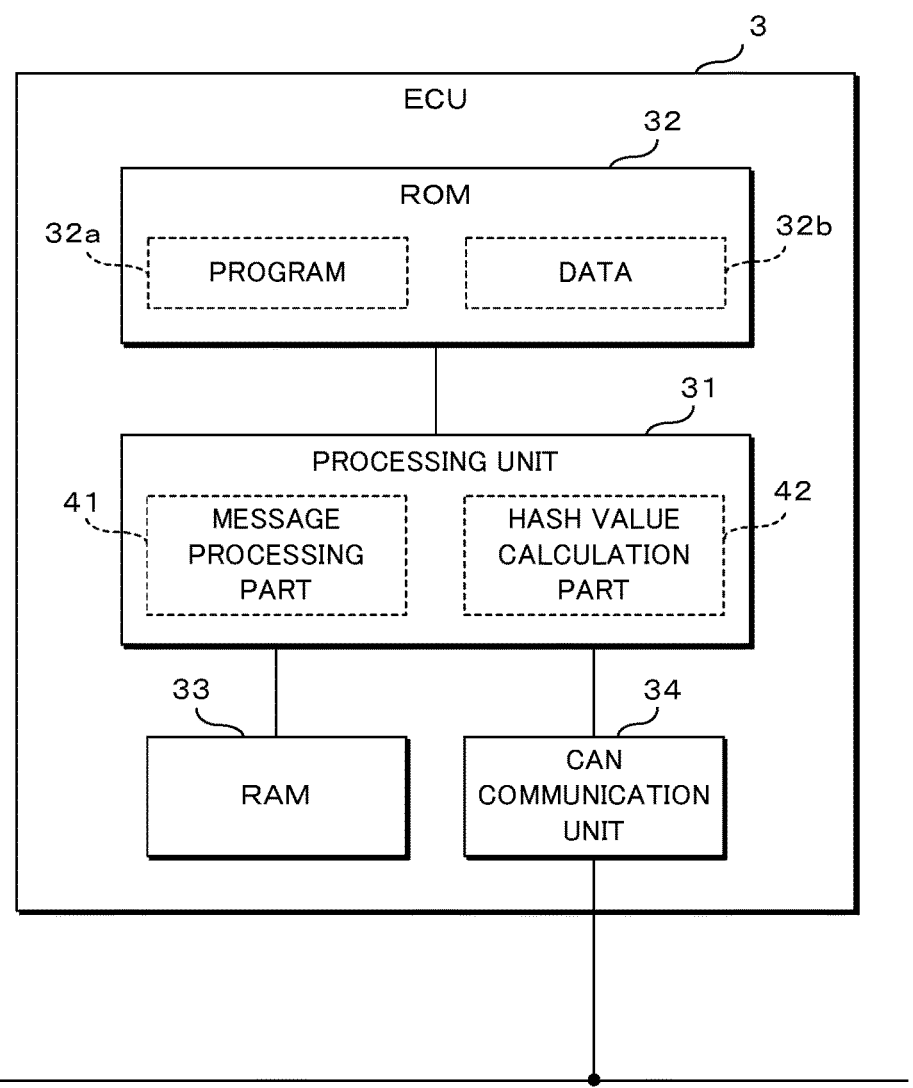
FIG. 2 is a block diagram illustrating the configuration of an ECU.

FIG. 2 is a block diagram illustrating the configuration of one of the ECUs 3. In FIG. 2, for the ECU 3 included in the vehicle 1, blocks related to communication, invalidity detection and the like are extracted and illustrated. These blocks are common to all the ECUs 3. The ECU 3 according to the present embodiment is configured to comprise a processing unit (processor) 31, a read only memory (ROM) 32, a random access memory (RAM) 33, a CAN communication unit (transceiver) 34 and so forth. The processing unit 31 is configured with an arithmetic processing device such as a central processing unit (CPU) or a micro-processing unit (MPU). The processing unit 31 reads out and executes a program 32a stored in the ROM 32 to perform various information processing, control processing or the like concerning the vehicle 1.

The ROM 32 is configured with a non-volatile memory element such as a flash memory or an electrically erasable programmable ROM (EEPROM). In the ROM 32, a program 32a to be executed by the processing unit 31 and various types of data 32b required for processing performed thereby are stored. The program 32a and data 32b stored in the ROM 32 are different for each ECU 3. The RAM 33 is configured with a data-rewritable memory element such as a static random access memory (SRAM) or a dynamic random access memory (DRAM). The RAM 33 stores therein various types of data generated by the processing performed by the processing unit 31.

The CAN communication unit 34 performs communication with another ECU 3 or the monitoring device 5 via the CAN bus in accordance with the CAN communication protocol. The CAN communication unit 34 converts information for transmission sent from the processing unit 31 into a signal according to the CAN communication protocol and outputs the converted signal to the CAN bus, to transmit information to another ECU 3 or the monitoring device 5. The CAN communication unit 34 obtains a signal output by another ECU 3 or the monitoring device 5 by sampling the potential at the CAN bus and receives information by converting the signal into binary information in accordance with the CAN communication protocol, to send the received information to the processing unit 31.

Moreover, the CAN communication unit 34 performs, in the case where collision occurs between its own message transmission and the message transmission by another ECU 3 or the monitoring device 5, processing of arbitration as to which message is to be transmitted first, so-called arbitration processing. For the message transmitted by each of the ECUs 3, an ID is determined in advance in accordance with the type of the message. The ID is information treated as a numeric value, and the smaller the value is, the higher the priority for message transmission is. In the communication system, therefore, if transmission of multiple messages are collided against each other on the CAN bus, a message with the highest priority is transmitted, and after the transmission of this message is completed, another message is transmitted. Because the arbitration processing performed by the CAN communication unit 34 is an existing technique, the description of detailed processing procedure thereof will not be described here.

According to the present embodiment, the processing unit 31 in the ECU 3 executes the program 32a to implement a message processing part 41, a hash value calculation part 42 and the like as software functional blocks. It is to be noted that a part or whole of the message processing part 41, a hash value calculation part 42 and the like may be implemented as hardware functional blocks. The message processing part 41 periodically performs processing of obtaining information such as information sensed by a sensor or feedback information from equipment to be controlled, creating a message including the obtained information based on the CAN protocol, and transmitting the created message to the CAN bus. It is noted that the transmission cycle of messages is determined for each type of message (i.e., ID), and thus the message processing part 41 may transmit messages at different cycles for each of different types of messages.

The hash value calculation part 42 performs processing of calculating a hash value in accordance with a calculation request from the monitoring device 5. The hash value calculation part 42 calculates a hash value by using a predetermined hash function based on a part or whole of the data stored in the ROM 32 (which may include both the program 32a and data 32b) and a random seed attached to the calculation request from the monitoring device 5. The detailed procedure of calculating a hash value by the hash value calculation part 42 will be described later. The hash value calculation part 42 transmits the calculated hash value to the monitoring device 5 as a response to the calculation request.

Figure 3:
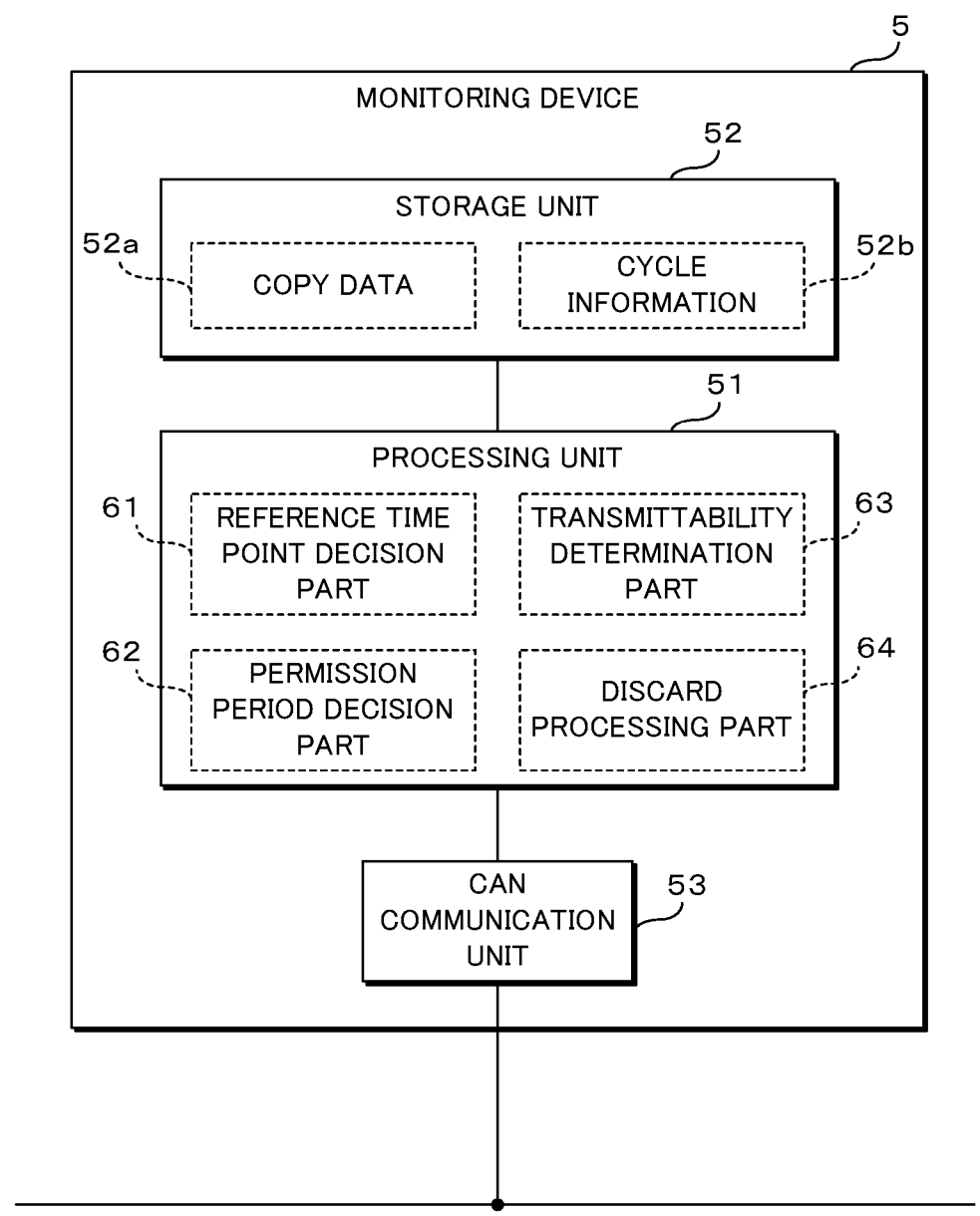
FIG. 3 is a block diagram illustrating the configuration of a monitoring device.

FIG. 3 is a block diagram illustrating the configuration of the monitoring device 5. The monitoring device 5 is configured to include a processing unit (processor) 51, a storage unit 52, a CAN communication unit (transceiver) 53 and so forth. The processing unit 51 is configured with an arithmetic processing device such as a CPU or MPU, which performs processing of monitoring the behavior, communication and the like of ECUs 3 in the vehicle 1 by reading out and executing a program stored in the storage unit 52. The storage unit 52 is configured with a data rewritable nonvolatile memory element such as a flash memory or an EEPROM. According to the present embodiment, the storage unit 52 stores therein copy data 52a obtained by copying the content stored in the ROM 32 of each ECU 3 mounted in the vehicle 1, and cycle information 52b related to the transmission cycle of a message transmitted by each ECU 3.

The CAN communication unit 53 performs communication with an ECU 3 via the CAN bus in accordance with the CAN communication protocol. The CAN communication unit 53 converts information for transmission sent from the processing unit 51 into a signal according to the CAN communication protocol and outputs the converted signal to the CAN bus, to transmit information to the ECU 3. The CAN communication unit 53 obtains a signal output by the ECU 3 by sampling the potential at the CAN bus and receives information by converting the signal into binary information in accordance with the CAN communication protocol, to send the received information to the processing unit 51.

According to the present embodiment, the processing unit 51 in the monitoring device 5 is provided with a reference time point decision part 61, a permission period decision part 62, a transmittability determination part 63, a discard processing part 64 and so forth. The reference time point decision part 61 to the discard processing part 64 may be configured as hardware functional blocks or software functional blocks. The reference time point decision part 61 and the permission period decision part 62 perform processing of deciding, for example, a condition for the monitoring device 5 to detect invalid message transmission. The transmittability determination part 63 performs processing of determining the transmittability of a message output onto the CAN bus, based on the condition decided by the reference time point decision part 61 and the permission period decision part 62. For the message the transmission of which is not permitted by the transmittability determination part 63, the discard processing part 64 performs processing of causing the ECU 3 to discard the message so as to prevent the ECU 3 from receiving the message.

FIG. 4 is a schematic view illustrating the configuration of copy data 52a stored in the storage unit 52 of the monitoring device 5. For all the ECUs 3 to be monitored that are mounted to the vehicle 1, the monitoring device 5 stores therein the same thing as the content stored in the ROM 32, as the copy data 52a. For the copy data 52a, identification information (ECUa, ECUb . . . in FIG. 4) uniquely attached to each ECU 3 is stored in association with the content stored in the ROM 32 of each ECU 3.

FIG. 5 is a schematic view illustrating the configuration of cycle information 52b stored in the storage unit 52 of the monitoring device 5. The monitoring device 5 stores, as cycle information 52b, identification information (CAN-ID) attached to the message transmitted and received on the network in the vehicle 1 and the cycle at which the message having the CAN-ID is transmitted in association with each other. In the illustrated example, the facts that a message with the CAN-ID of 1 has the transmission cycle of 10 ms, that a message with the CAN-ID of 2 has the transmission cycle of 50 ms, and that a message with the CAN-ID of 3 has the transmission cycle of 32 ms are stored for the cycle information 52b. It is noted that these numeric values are mere examples.

<Invalid Message Detection Processing>

In the communication system according to the present embodiment, the processing of detecting that an invalid message is transmitted onto the CAN bus through which multiple ECUs 3 transmit and receive messages is performed by the monitoring device 5. It is possible that, for example, an invalid communication device is improperly connected to the CAN bus, and may transmit an invalid message onto the CAN bus. It is also possible that, for example, improper alteration or modification is made to any one of the ECUs 3 mounted to the vehicle 1 and this ECU 3 may transmit an invalid message. These are mere examples of invalid messages, and an invalid message detected by the monitoring device 5 may be caused by factors other than the ones described above.

An invalid communication device may transmit an invalid message with a specific CAN-ID in accordance with the CAN protocol. While a valid CAN-ID utilized in the communication system of the vehicle 1 is used for the CAN-ID attached to such an invalid message, the other data included in the invalid message is invalid data. In the case where an ECU 3 receives an invalid message based on the CAN-ID, the ECU 3 is to perform processing based on invalid data. The communication system according to the present embodiment is to detect an invalid message with a proper CAN-ID attached thereto, a so-called spoofing message.

Figure 6:
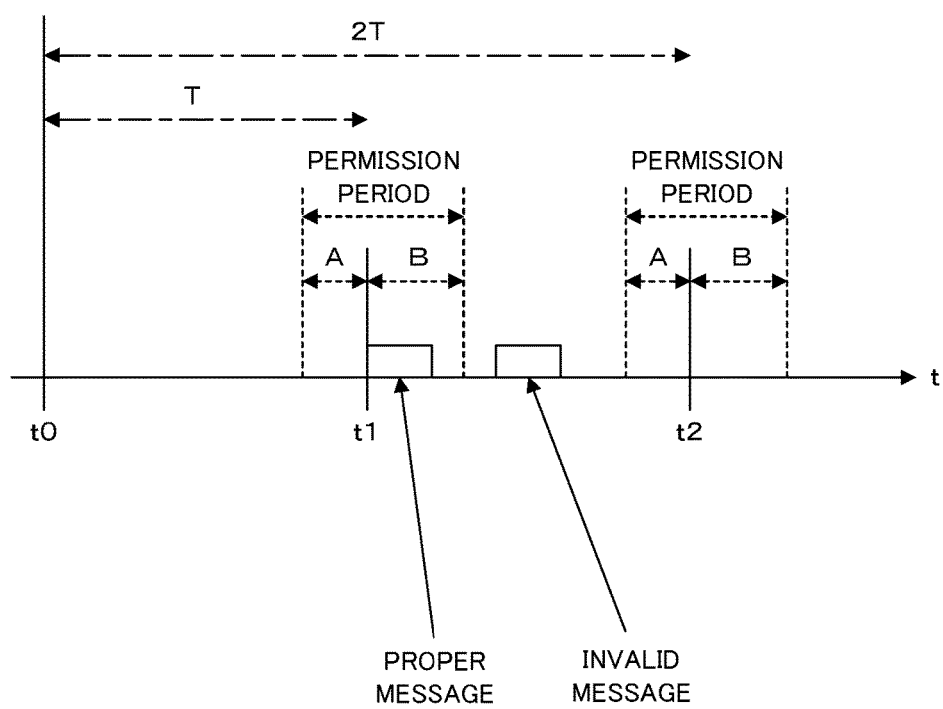
FIG. 6 is a schematic view for illustrating invalid message detection processing performed by the monitoring device.

The monitoring device 5 according to the present embodiment determines whether or not a message to be transmitted periodically is transmitted at correct cycles, to detect an invalid message. FIG. 6 is a schematic view for illustrating invalid message detection processing performed by the monitoring device 5. The monitoring device 5 decides, for each CAN-ID attached to a message transmitted and received in the communication system, a permission period during which transmission of the message with the CAN-ID is permitted. FIG. 6 illustrates a permission period decided by the monitoring device 5, for a message with one CAN-ID attached thereto. It is to be noted that the present embodiment does not include a case where one CAN-ID is used by more than one ECUs 3, i.e., where a message with the same CAN-ID is transmitted by multiple ECUs 3.

In the present example, the transmission cycle of a message to be monitored by the monitoring device 5 is denoted as T. The reference time point decision part 61 in the monitoring device 5 performs a predetermined procedure with the ECU 3 transmitting the message, to decide the reference time point t0 of message transmission (details of the processing for deciding the reference time point will be described later). The permission period decision part 62 in the monitoring device 5 obtains a transmission cycle T for a message to be monitored by referring to the cycle information 52b stored in the storage unit 52. The permission period decision part 62 sets the time point t1 obtained by adding the transmission cycle T to the reference time point t0 as the scheduled transmission time point t1 for the message. Likewise, the permission period decision part 62 sets the time point t2 obtained by adding twice the transmission cycle T to the reference time point t0 as the scheduled transmission time point t2, the time point t3 obtained by adding three times the transmission cycle T to the reference time point t0 as the scheduled transmission time point t3, . . . , and the time point to obtained by adding n times the transmission cycle T to the reference time point t0 as the scheduled transmission time point to (n=1, 2, 3 . . . ).

The permission period decision part 62 of the monitoring device 5 decides, as a permission period, a period including the scheduled transmission time point t1 with the addition of predetermined periods A and B. The permission period decision part 62 decides a period corresponding to t1−A≤t≤t1+B as a permission period. Same applies to the scheduled transmission time points t2, t3 . . . . That is, the permission period decision part 62 decides that a period corresponding to t0+nT−A≤t≤t0+nT+B(n=1, 2, 3 . . . ) is a permission period.

The period A and period B for deciding the permission period are decided in advance based on a measurement result or the like performed by simulation or by a real machine in the communication system, for example. As for the period A and period B, the same value may be used for all messages, or a different value may be used for each CAN-ID, for example. In the case of using a different value for each CAN-ID, the period A and the period B may be stored in the cycle information 52b in association with the CAN-ID. The period A may be decided based on a clock error or the like between the monitoring device 5 and the ECU 3 transmitting the message. The period B is decided in consideration of time by which this message is delayed due to the arbitration processing.

The CAN communication unit 53 in the monitoring device 5 monitors transmission of messages to the CAN bus, and if detecting the transmission of a message, notifies the processing unit 51 thereof. The transmittability determination part 63 of the processing unit 51 obtains information related to the CAN-ID of the transmitted message as well as the starting time point or ending time point of message transmission, based on the notification from the CAN communication unit 53. Furthermore, the transmittability determination part 63 obtains a permission period decided by the permission period decision part 62 for the obtained CAN-ID. The transmittability determination part 63 determines whether or not the message, the transmission of which is detected, is transmitted during the permission period.

The condition for determining whether or not the message is transmitted during the permission period may include two such conditions that the transmission of the message is started in the permission period or that the transmission of the message is completed in the permission period. Either one of the conditions may be employed, while the value of the period B may appropriately be set in accordance with the condition to be employed. In the present embodiment, under the condition that the message transmission is completed in the permission period, the transmittability determination part 63 is to determine whether or not the message is transmitted during the permission period.

In the case where the message is not transmitted during the permission period, the transmittability determination part 63 determines that this message is an invalid message, and determines that the transmission of the message is not permitted. If the transmittability determination part 63 determines that the transmission of the message is not permitted, the discard processing part 64 in the monitoring device 5 performs processing of causing the ECU 3 connected to the CAN bus to discard the message. The details of the message discard processing will be described later.

If the message is transmitted during the permission period, the transmittability determination part 63 further performs determination on another condition. The transmittability determination part 63 performs determination on the condition related to the arbitration processing and determination on the condition related to the message non-transmission period.

Figure 7:
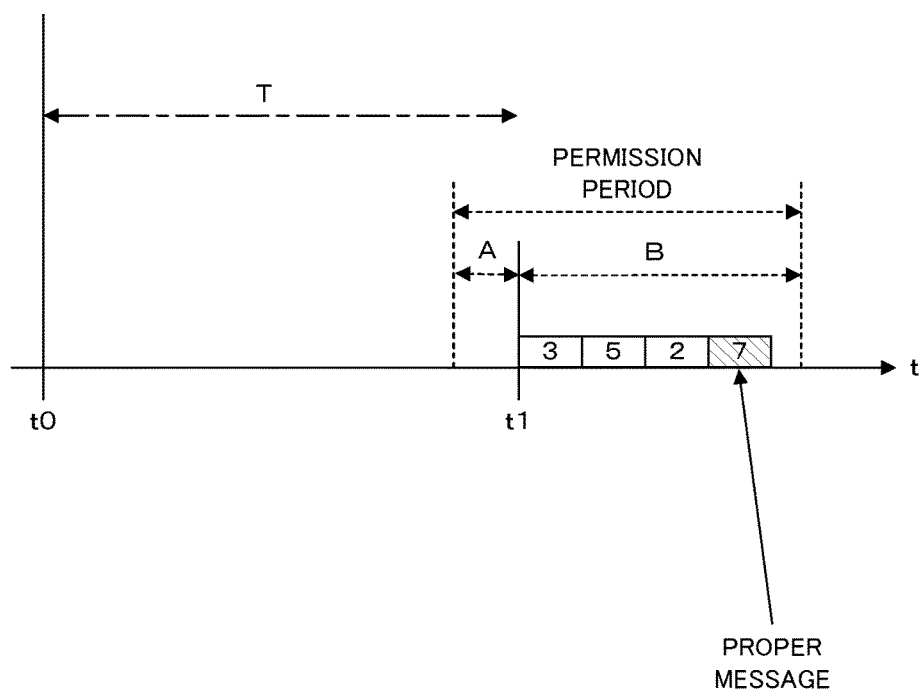
FIG. 7 is a schematic view for illustrating determination on a condition related to arbitration processing, performed by a transmittability determination part.
Figure 8:
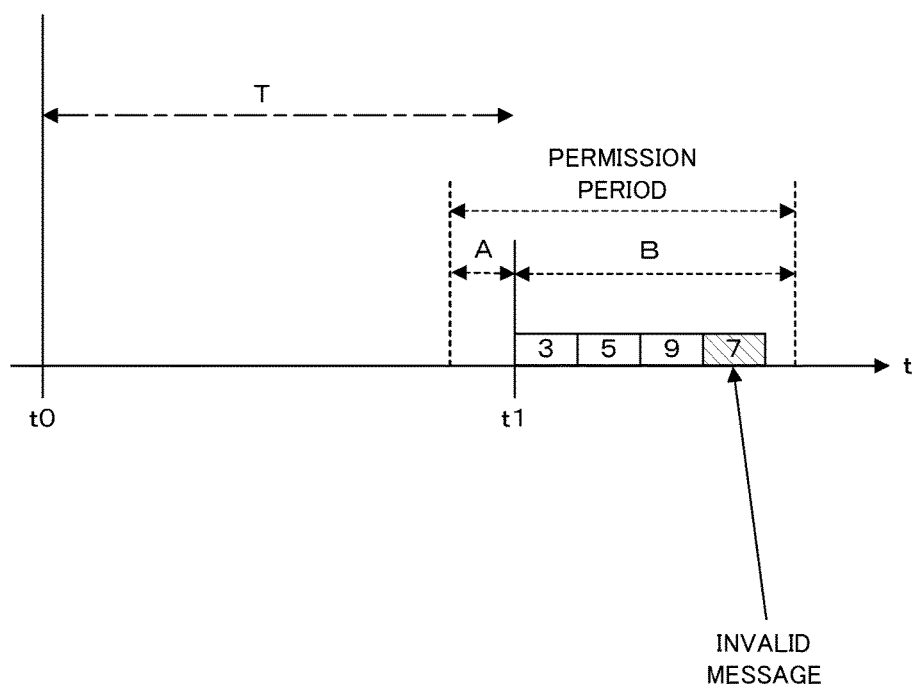
FIG. 8 is a schematic view for illustrating determination on a condition related to arbitration processing, performed by the transmittability determination part.
Figure 9:
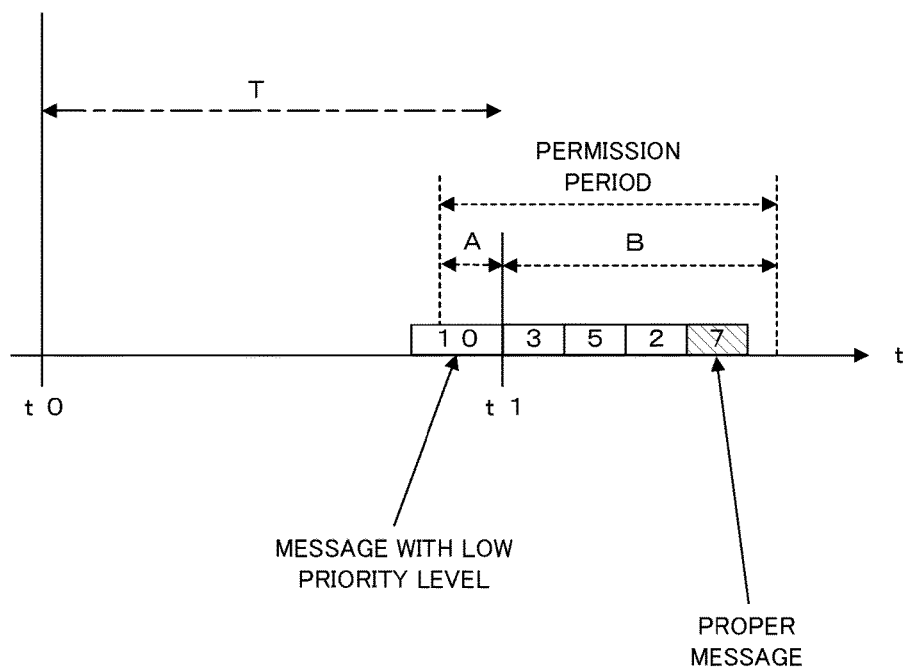
FIG. 9 is a schematic view for illustrating determination on a condition related to arbitration processing, performed by the transmittability determination part.

FIGS. 7 to 9 are schematic views for illustrating determination on the condition related to arbitration processing, performed by the transmittability determination part 63. In the CAN communication system as described above, arbitration processing is performed if the transmission of multiple messages are collided against each other, and thus a delay may be caused in the transmission of a message having a low priority level. FIG. 7 illustrates the state where a determination target message has the CAN-ID of 7, and three messages (messages with the CAN-Ids of 3, 5 and 2, respectively) having higher priority levels than the target message are transmitted earlier due to the arbitration processing.

The transmittability determination part 63 determines whether or not other message transmission is performed before the transmission of the target message during the permission period of the target message. In the case where other message transmission is performed, the transmittability determination part 63 checks the CAN-ID(s) of one or more other messages that have been transmitted, and compares it/them with the CAN-ID of the target message. According to the CAN protocol, the CAN-ID attached to a message indicates its priority. The smaller the numeric value is, the higher the priority is. The transmittability determination part 63 determines that the target message is a proper one only if either one of the condition 1 or condition 2 as described below is satisfied for all the other messages transmitted previously.

Condition 1: The CAN-IDs of other messages are smaller than the CAN-ID of the target message, i.e., all the previous messages have higher levels of priority.

Condition 2: Though another message has a priority level lower than that of the target message, the transmission of the message with the low priority level is started before the permission period for the target message is started.

As to the condition 1, if at least one of the CAN-IDs of the previously-transmitted messages among the messages transmitted in sequence after being permitted is larger than the CAN-ID of the target message, i.e., if a message with a low priority level has previously been transmitted, the transmittability determination part 63 determines that the target message is an invalid message. FIG. 8 illustrates the state where a determination target message has the CAN-ID of 7 and the messages with the CAN-IDs of 3, 5 and 9 are transmitted prior to the transmission of the target message. The message with the CAN-ID of 9 has a priority level lower than the target message which has the CAN-ID of 7. It is thus possible that the target message is not delayed to the illustrated timing due to the arbitration processing, but is transmitted at the illustrated timing by an invalid communication device. If the transmittability determination part 63 determines that the target message is an invalid message and is not permitted for the transmission thereof, the discard processing part 64 performs the processing of discarding the message.

The condition 2 defines an exception to the condition 1. That is, according to the condition 1, another message preceding to the target message is required to have a priority level higher than that of the target message. Under the condition 2, however, an initially-transmitted message among one or more other messages transmitted during the permission period for messages may have a priority level lower than that of the target message if the initially-transmitted message had already been transmitted before the starting time point of the permission period. FIG. 9 illustrates the state where the message with the CAN-ID of 10 is transmitted before the permission period is started, in addition to the messages illustrated in FIG. 7. The message with the CAN-ID of 10 has a priority level lower than the target message which has the CAN-ID of 7. Since the message with the low priority level however is a message started to be transmitted before the permission period for the target message is started, the transmittability determination part 63 permits the transmission of the target message.

Figure 10:
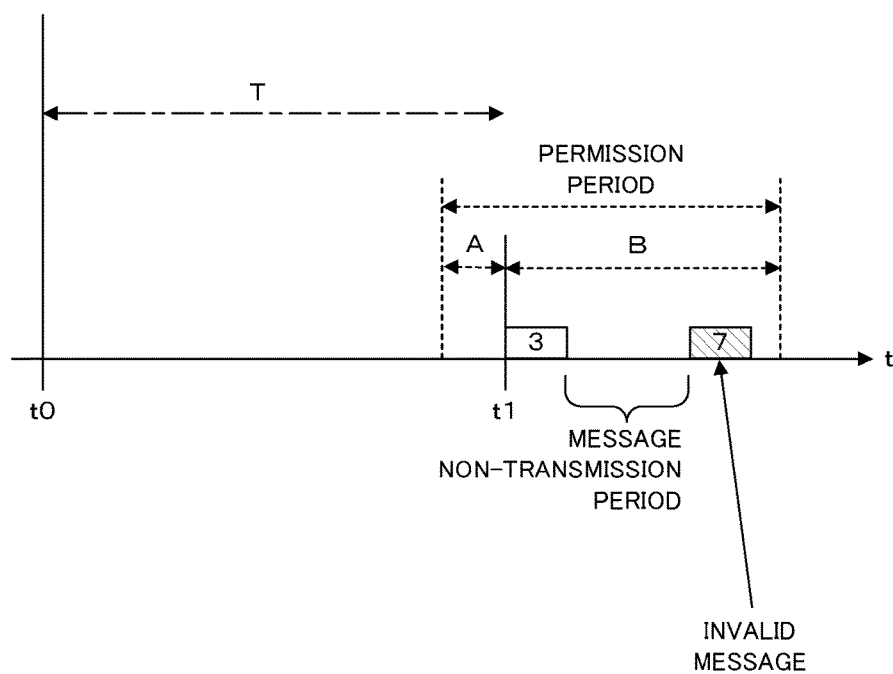
FIG. 10 is a schematic view for illustrating determination on a condition related to a message non-transmission period, performed by the transmittability determination part.

FIG. 10 is a schematic view for illustrating determination on the condition related to a message non-transmission period, performed by the transmittability determination part 63. The transmittability determination part 63 inspects whether or not a message non-transmission period during which no message is transmitted onto the CAN bus is present in a period from the scheduled transmission time point t1 to the transmission of the target message in the permission period for the target message. In the case where the message non-transmission period is present, the transmittability determination part 63 determines whether or not the message non-transmission period exceeds a predetermined length. In the case where more than one message non-transmission periods are present, the transmittability determination part 63 individually compares each of the message non-transmission periods with the predetermined length.

As the predetermined length, for example, a period necessary for transmitting approximately three to ten bits of a message may be set. This is based on, for example, a period of three bits for the inter frame space (IFS), or ten bits including seven bits for the end of frame (EOF) added to IFS. These numeric values are however mere examples, and the predetermined length may be a period other than these.

If the message non-transmission period which is present in a period from the scheduled transmission time point to message transmission exceeds a predetermined length, it can be determined that the delay in the target message is not a proper delay. In such a case, therefore, the transmittability determination part 63 determines that the target message is an invalid message and is not permitted for the transmission thereof. If the transmittability determination part 63 determines that the target message is an invalid message and is not permitted for the transmission thereof, the discard processing part 64 performs the processing of discarding the message.

Moreover, in the case where the message non-transmission period is not present in a period from the scheduled transmission time point to the message transmission, or where the message non-transmission period, even if present, is shorter than the predetermined length, the transmittability determination part 63 determines that the target message is a proper message and permits the transmission thereof.

As such, if the transmission of the message with the CAN-ID of a determination target is detected during the permission period, the transmittability determination part 63 determines whether or not a delay other than the delay caused by proper arbitration processing occurs in the transmission of this message. That is, the transmittability determination part 63 sets such conditions for permitting transmission of a determination target message, that the message transmitted prior to the target message during the permission period has a high priority level (except for any message started to be transmitted before the permission period), and that a message non-transmission period exceeding a predetermined length is not present in a period from the scheduled transmission time point to the transmission of the target message. The transmittability determination part 63 permits transmission of the target message in the case where both of the conditions are satisfied, while not permitting transmission of the target message in the case where at least one of the conditions is not satisfied.

It is noted that the monitoring device 5 stores in the storage unit 52 the history of messages transmitted onto the CAN bus in order for the transmittability determination part 63 to perform determination on these conditions. The history to be stored includes, for example, information related to the CAN-IDs of the transmitted messages as well as the starting time point or ending time point of transmission. Monitoring of the message transmission by the monitoring device 5 is performed for each CAN-ID. That is, the monitoring device 5 decides a permission period for each CAN-ID, and determines whether or not the message may be transmitted for each CAN-ID. For example, FIG. 7 illustrates an example where the monitoring device 5 performs determination on the message with the CAN-ID of 7 as a target. Here, the monitoring device 5 also determines the transmittability individually for the respective messages with the CAN-IDs of 3, 5 and 2.

Figure 11:
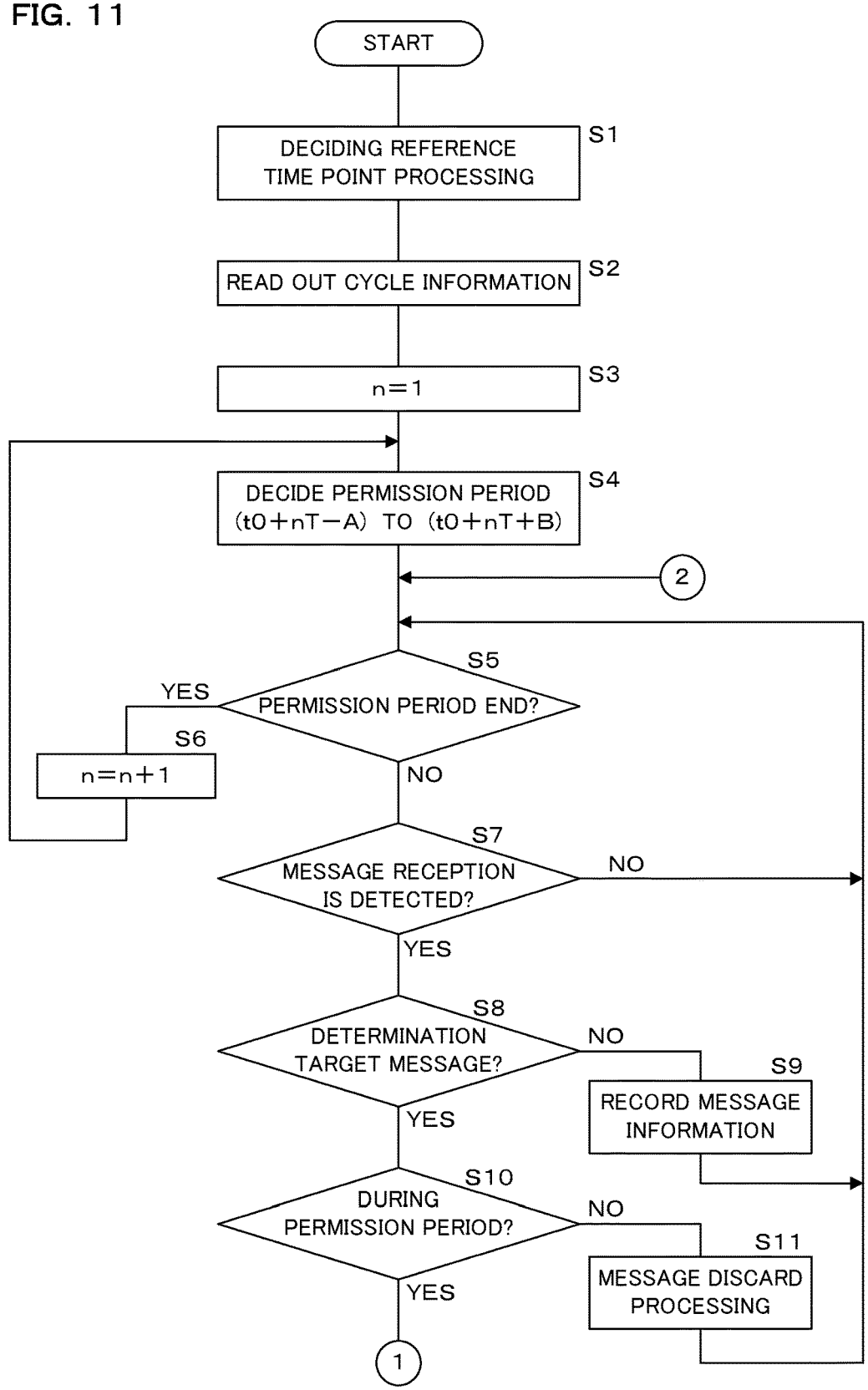
FIG. 11 is a flowchart illustrating a procedure of message transmittability determination processing performed by the monitoring device.
Figure 12:
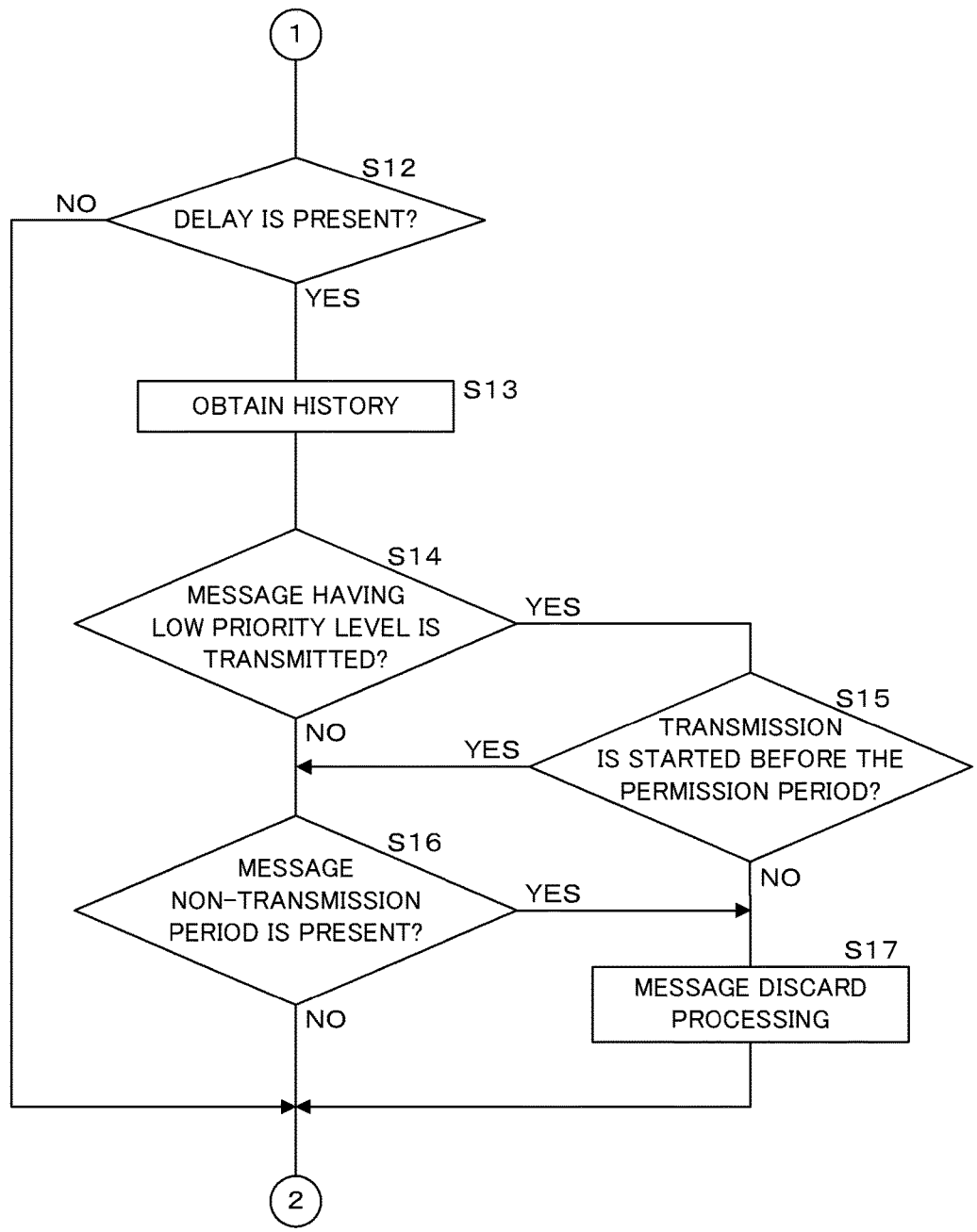
FIG. 12 is a flowchart illustrating a procedure of message transmittability determination processing performed by the monitoring device.

FIGS. 11 and 12 show a flowchart illustrating a procedure of message transmittability determination processing performed by the monitoring device 5. It is noted that the variable n used in the present flowchart may be implemented using a register included in the processing unit 51 of the monitoring device 5 or the storage region such as a memory. First, the processing unit 51 in the monitoring device 5 performs processing of deciding the reference time point t0 at the reference time point decision part 61 (step S1). The processing unit 51 reads out cycle information 52b stored in the storage unit 52 (step S2), and obtains the transmission cycle T of a determination target message. Subsequently, the processing unit 51 initializes the value of the variable n to 1 (step S3). The permission period decision part 62 of the processing unit 51 decides a permission period based on the reference time point t0 decided at step S1, the cycle T obtained at step S2, predetermined constants A and B, and the variable n (step S4). The permission period may be decided as a period from (t0+nT−A) to (t0+nT+B).

The transmittability determination part 63 of the processing unit 51 determines whether or not the permission period decided at step S4 has ended (step S5). If the permission period has not ended (S5: NO), the transmittability determination part 63 inspects whether or not message reception on the CAN bus is detected at the CAN communication unit 53 (step S7). If the message reception is not detected (S7: NO), the transmittability determination part 63 returns the processing to step S5. If the message reception is detected (S7: YES), the transmittability determination part 63 checks the CAN-ID of the detected message to determine whether or not this message is a determination target message (step S8). If this message is not a determination target message (S8: NO), the transmittability determination part 63 records information related to the message (information such as CAN-ID, starting time point and ending time point of transmission) as a history (step S9), and returns the processing to step S5. If this message is a determination target message (S8: YES), the transmittability determination part 63 determines whether or not the message is transmitted during the permission period (step S10). If the message is not transmitted during the permission period (S10: NO), the processing unit 10 performs message discard processing by the discard processing part 64 (step S11), and returns the processing to step S5.

If the determination target message is transmitted during the permission period (S10: YES), the transmittability determination part 63 determines the presence or absence of a delay for the message with respect to the scheduled transmission time point tn (step S12). If a delay is absent (S12: NO), the transmittability determination part 63 determines that the transmission is permitted because the message is a proper one, and returns the processing to step S5 without the message discard processing. If a delay of a message with respect to the scheduled transmission time point tn is present (S12: YES), the transmittability determination part 63 obtains the history related to message transmission recorded at step S9 (step S13).

The transmittability determination part 63 determines whether or not a message having a priority level lower than that of the target message is transmitted during a period from the scheduled transmission time point tn to the transmission of the target message (step S14). If a message having the low priority level is transmitted (S14: YES), the transmittability determination part 63 determines whether or not the transmission of the message having the low priority level had been started before the permission period for the target message (step S15).

If a message having a low priority level is not transmitted (S14: NO), or transmission of the message having the low priority level is started before the permission period (S15: YES), the transmittability determination part 63 determines the presence or absence of a message non-transmission period exceeding a predetermined length in a period from the scheduled transmission time point to for a determination target message to the completion of the transmission of the message. (step S16). If a message non-transmission period is absent (S16: NO), the transmittability determination part 63 determines that the transmission is permitted because the message is a proper one, and returns the processing to step S5 without the message discard processing.

If transmission of the message having the low priority level is not started before the permission period (S15: NO), or if a message non-transmission period exceeding the predetermined length is present (S16: YES), the transmittability determination part 63 determines that the transmission is not permitted because the message is not a proper one, and the discard processing part 64 performs the message discard processing (step S17), and returns the processing to step S5.

If it is determined that the permission period has ended at step S5 (S5: YES), the processing unit 51 adds 1 to the variable n (step S6), returns the processing to step S4, and performs monitoring for the next permission period.

<Message Discard Processing>

In the communication system according to the present embodiment, in the case of being determined that the message output onto the CAN bus is not a proper one and thus the transmission thereof is not permitted, the monitoring device 5 causes the ECU 3 connected to the CAN bus to perform processing of discarding this message. The message transmitted and received in the communication system according to the present embodiment is in accordance with the CAN protocol, and is configured to include a CAN header, a data field, a cyclic redundancy check (CRC) field, ACK field and end of frame (EOF). The CAN header includes the start of frame (SOF) according to the conventional CAN protocol, an arbitration field, a control field and so forth, and the CAN-ID described above is set on the arbitration field. In the data field, the body of information to be transmitted and received between the ECUs 3, such as a control instruction to an ECU 3 or the sensed result of a sensor, is stored. The CRC field, ACK field and EOF are the same as the ones used in the conventional CAN protocol, and thus will not be described in detail. The CRC field stores therein information for detecting an error. The ACK field is a field for a reception response by the ECU 3 which receives the frame. The EOF is a specific bit sequence indicating the end of the field.

For the message determined by the transmittability determination part 63 that the transmission thereof is not permitted, the discard processing part 64 in the monitoring device 5 transmits an error frame to the CAN bus during the output period of the EOF in the message. The error frame allows all the ECUs 3 connected to the CAN bus to discard invalid messages while being received.

In order to discard the message by this method, it is necessary for the transmittability determination part 63 in the monitoring device 5 to finish determination before the EOF of the message is output to the CAN bus. The transmittability determination part 63 starts the determination processing as described above at the time point when the output of the CAN header of the message onto the CAN bus is finished, and ends the determination before the output of EOF. As the length of the message according to the CAN protocol is defined, the transmittability determination part 63 may calculate the transmission ending time point even before the end of the message transmission.

The monitoring device 5 may also be configured to store the CAN-ID determined by the transmittability determination part 63 as corresponding to an invalid message, and if the message with the same CAN-ID is output to the CAN bus afterward, the discard processing part 64 may discard the message without determination by the transmittability determination part 63. Furthermore, the processing of discarding a message by the monitoring device 5 may be performed by various other methods, not limited to the method described above. Moreover, the monitoring device 5 may be configured to perform, if the transmittability determination part 63 determines that a message is invalid, processing other than discarding, such as transmission of an alert message to the ECU 3, reporting to the user of the vehicle 1, transmission of information to an external server device, or shutdown of the communication system or the communication network of interest.

<Reference Time Point Decision Processing>

Figure 13:
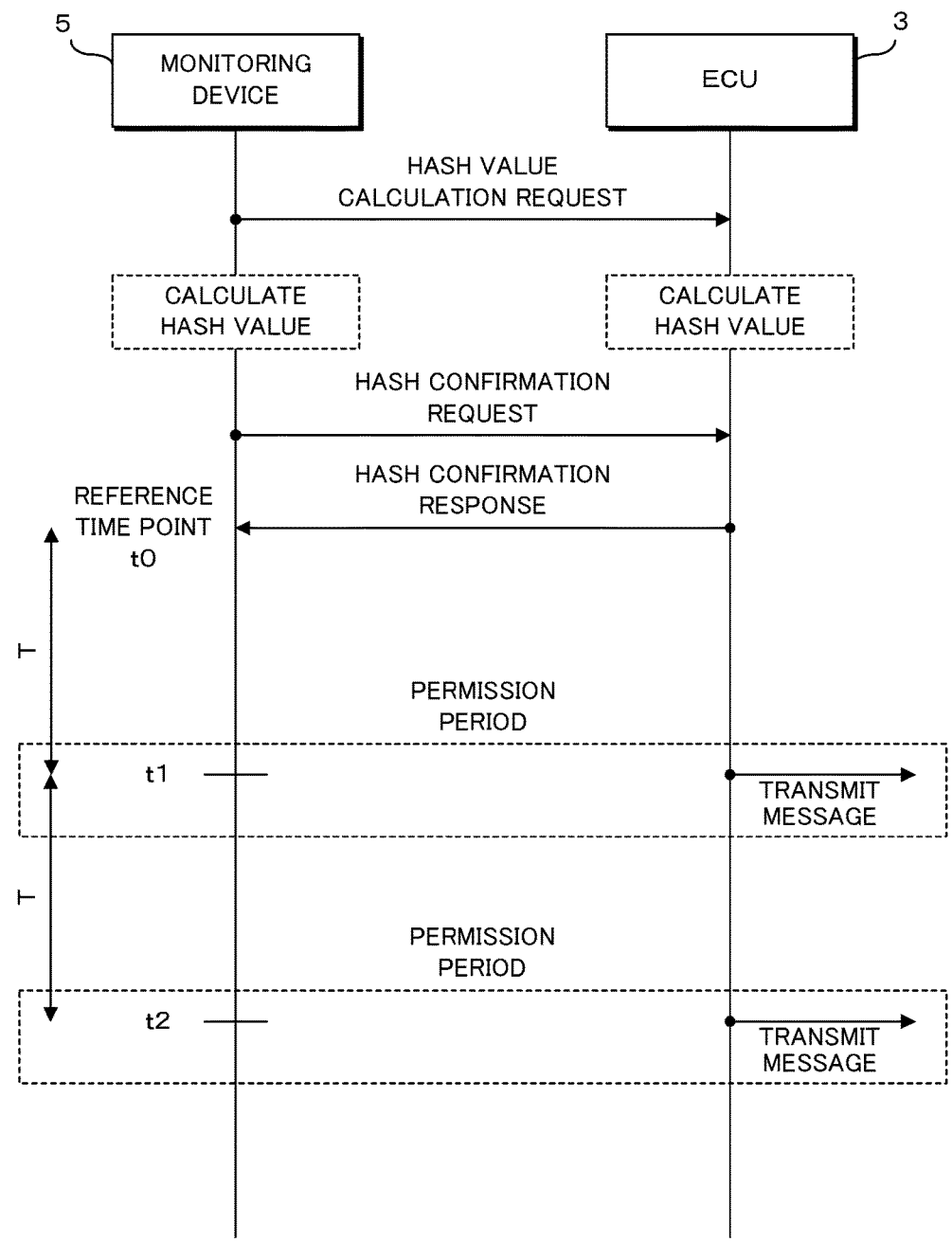
FIG. 13 is a schematic diagram for illustrating reference time point decision processing performed between an ECU and the monitoring device.

In the communication system according to the present embodiment, it is necessary to perform processing of deciding the reference time point t0 before the message transmission by the ECU 3 and monitoring of the message transmission by the monitoring device 5 are started. FIG. 13 is a schematic diagram for illustrating reference time point decision processing performed between an ECU 3 and the monitoring device 5. After being activated by turning on the power or the like, the monitoring device 5 in the communication system according to the present embodiment starts the processing of deciding the reference time point by the reference time point decision part 61 of the processing unit 51.

In the reference time point decision processing, the reference time point decision part 61 in the monitoring device 5 first generates information to be used for calculating a hash value. According to the present embodiment, the reference time point decision part 61 generates a random seed and region specifying information. The reference time point decision part 61 regards the data with a predetermined bit length obtained by generating a random number based on a predetermined algorithm as the random seed. The region specifying information is to specify the region of the ROM 32 to be a target for hash value calculation, and corresponds to information such as, for example, a start address and an end address, or a start address and data size. The reference time point decision part 61 may decide the start address based on a random number, for example, and decide the end address by adding a predetermined number to the start address.

The reference time point decision part 61 in the monitoring device 5 transmits the generated random seed and region specifying information to the ECU 3 together with the calculation request for the hash value. Moreover, the reference time point decision part 61 reads out the content stored in the ECU 3 to be processed from the copy data 52a of the storage unit 52, and calculates a hash value using the read stored content and the generated random seed as well as region specifying information. The reference time point decision part 61 extracts a portion specified by the region specifying information from the stored content that has been copied, and calculates a hash value by inputting the extracted stored content and random seed into a predetermined hash function. According to the present embodiment, the reference time point decision part 61 is to calculate a hash value of 160 bits using the hash function of SHA-1.

The ECU 3 which received the random seed and region specifying information from the monitoring device 5 uses the content stored in its own ROM 32 and the received random seed as well as region specifying information, to calculate a hash value by the hash value calculation part 42 of the processing unit 31. The hash value calculation part 42 extracts the portion specified by the region specifying information from the ROM 32, and calculates a hash value by inputting the extracted stored content and the random seed into a predetermined hash function. Since the hash function used by the monitoring device 5 is the same as the hash function used by the ECU 3, and the content stored in the copy data 52a by the monitoring device 5 is the same as the content stored in the ROM 32 by the ECU 3, the monitoring device 5 and ECU 3 are supposed to calculate the same hash value. If the hash values are different, it is possible that the content stored in the ROM 32 of the ECU 3 may have been falsified.

Here, a method of calculating a hash value by the monitoring device 5 and ECU 3 will briefly be described. The monitoring device 5 and ECU 3 may be configured to calculate a hash value by utilizing an existing hash function, such as Message Digest (MD) 4, MD 5, SHA-1, SHA-256, SHA-384, SHA-512, EIPEMD-160 or SHA-3, for example. Each of these is a so-called one-way hash function, which outputs one hash value for the input information. The information to be input into the hash function is a part or whole of the program 32a or data 32b stored in the ROM 32 of the EUC 3 in the present embodiment. Regardless of whether the information input into the hash function is either the program 32a or data 32b, or both the program 32a and data 32b, the hash function may simply treat the input information as binary information and calculate a hash value. The monitoring device 5 and EUC 3 store therein a predetermined hash function, which is used to calculate a hash value.

A calculation method will be described below for the case where the monitoring device 5 and ECU 3 calculate a hash value using the hash function of SHA-1. As to the detailed processing for the hash function of SHA-1 as well as the case where the monitoring device 5 and ECU 3 use a different hash function, these hash functions are based on the existing technology and thus will not be described.

In the case of using the hash function of SHA-1, the monitoring device 5 and ECU 3 first perform padding processing. In the padding processing, the monitoring device 5 and ECU 3 adjust the size of the information to be processed by adding extra data after the input information so as to correspond to an integer multiple of a predetermined value (512 bits). Next, the monitoring device 5 and ECU 3 perform the first processing of dividing the padded information into blocks each having 512 bits and calculating eighty values for each of the blocks.

Subsequently, the monitoring device 5 and ECU 3 perform, for the initial value having a predetermined size (160 bits), arithmetic operation using the value calculated by the first processing, and perform the second processing of setting the value of 160 bits obtained after the arithmetic operation as a hash value. In the second processing, first, the monitoring device 5 and ECU 3 perform arithmetic operation of eighty steps for the initial value of 160 bits, using eighty values calculated for one block. By this eighty-step arithmetic operation, the information of the block may be mixed into the initial value of 160 bits, and the value of 160 bits may be obtained as an output. The monitoring device 5 and ECU 3 set the obtained value of 160 bits as the initial value, to similarly perform arithmetic operation of 80 steps using eighty values calculated for the next block. The monitoring device 5 and ECU 3 perform the processing of 80 steps similarly for all the blocks, and sets the finally-obtained value of 160 bits as the hash value.

Furthermore, according to the present embodiment, it is necessary for the monitoring device 5 and ECU 3 to calculate a hash value using the random seed generated by the monitoring device 5. For example, the monitoring device 5 and ECU 3 may use the random seed for the data to be added to the input information in the padding processing described above. Moreover, the monitoring device 5 and ECU 3 may also use the random seed for the initial value of 160 bits, for example, in the second processing described above. It is assumed in the present embodiment that a random seed is used for the initial value in the second processing.

The method of utilizing the random seed by the monitoring device 5 and ECU 3 is not limited to the one described above. For example, the monitoring device 5 and ECU 3 may regard a logical operation value (exclusive logical sum or the like) of the random seed and the content stored in the ROM 32 which is a target for hash value calculation as information input into the hash function. For example, the monitoring device 5 and ECU 3 may regard the information including the random seed added to a predetermined position of the header portion, tail portion or the like of the content stored in the ROM 32 which is a target for hash value calculation, as information input into the hash function.

After finishing the transmission of the random seed as well as region specifying information to the ECU 3 and the calculation of the hash value, the reference time point decision part 61 in the monitoring device 5 performs processing of extracting a part of the calculated hash value. According to the present embodiment, the reference time point decision part 61 extracts a value of 64 bits from the calculated 160-bit hash value, and sets the extracted value as confirmation information, i.e. information used for confirmation. The reference time point decision part 61 transmits a hash confirmation request including the extracted confirmation information to the ECU 3 of a processing target.

The ECU 3 which received the hash confirmation request from the monitoring device 5 obtains confirmation information included in the received hash confirmation request. The processing unit 31 of the ECU 3 compares the confirmation information obtained from the monitoring device 5 with the hash value calculated by the processing unit 31 itself at the hash value calculation part 42. The processing unit 31 determines whether or not the hash value calculated by the hash value calculation part 42 includes a part of the hash value obtained from the monitoring device 5 as the confirmation information. If it is determined that the hash value for the confirmation information is not included in its own hash value, it is conceivable that the hash value calculated by the ECU 3 does not match the hash value calculated by the monitoring device 5, and therefore, the processing unit 31 interrupts the processing and sends an error notification to the monitoring device 5.

If it is determined that the hash value for the confirmation information is included in its own hash value, the hash value calculated by the ECU 3 is regarded as the same value as the hash value calculated by the monitoring device 5, and the processing unit 31 performs the processing of transmitting a response to the hash confirmation request (hash confirmation response) to the monitoring device 5. Here, the processing unit 31 extracts, from the hash value of 160 bits calculated by the hash value calculation part 42, information of 64 bits succeeding the confirmation information sent from the monitoring device 5, as response information. The processing unit 31 transmits the extracted response information of 64 bits to the monitoring device 5 while including it in the hash confirmation response. It is noted that the method of extracting the confirmation information and response information from the hash value is not limited thereto. For example, the confirmation information and the response information may overlap with each other in part.

The reference time point decision part 61 in the monitoring device 5 which received the hash confirmation response from the ECU 3 obtains response information included in the received hash confirmation response. The reference time point decision part 61 compares the response information obtained from the ECU 3 with the hash value calculated by itself. The reference time point decision part 61 determines whether or not a portion of the hash value calculated by itself excluding the confirmation information includes a part of the hash value obtained as the response information from the ECU 3. If it is determined that the hash value for the response information is not included in its own hash value, it is conceivable that the hash value calculated by the monitoring device 5 does not match the hash value calculated by the ECU 3, and therefore, the reference time point decision part 61 interrupts the processing and sends an error notification or the like to the ECU 3.

If it is determined that the hash value for the response information is included in its own hash value, the reference time point decision part 61 regards the hash value calculated by the monitoring device 5 and the hash value calculated by the ECU 3 as the same value. Here, the reference time point decision part 61 may notify the ECU 3 that determination of the hash value is succeeded. The reference time point decision part 61 decides the time point when the reception of a proper hash confirmation response from the ECU 3 is completed as the reference time point t0. After deciding the reference time point t0, the monitoring device 5 decides the scheduled transmission time point and the permission period as described above, and starts monitoring message transmission.

Likewise, the processing unit 31 in the ECU 3 sets the time point when the transmission of a hash confirmation response to the monitoring device 5 is completed, as the reference time point t0. The message processing part 41 in the ECU 3 transmits messages at the cycle T with respect to the reference time point t0.

Figure 14:
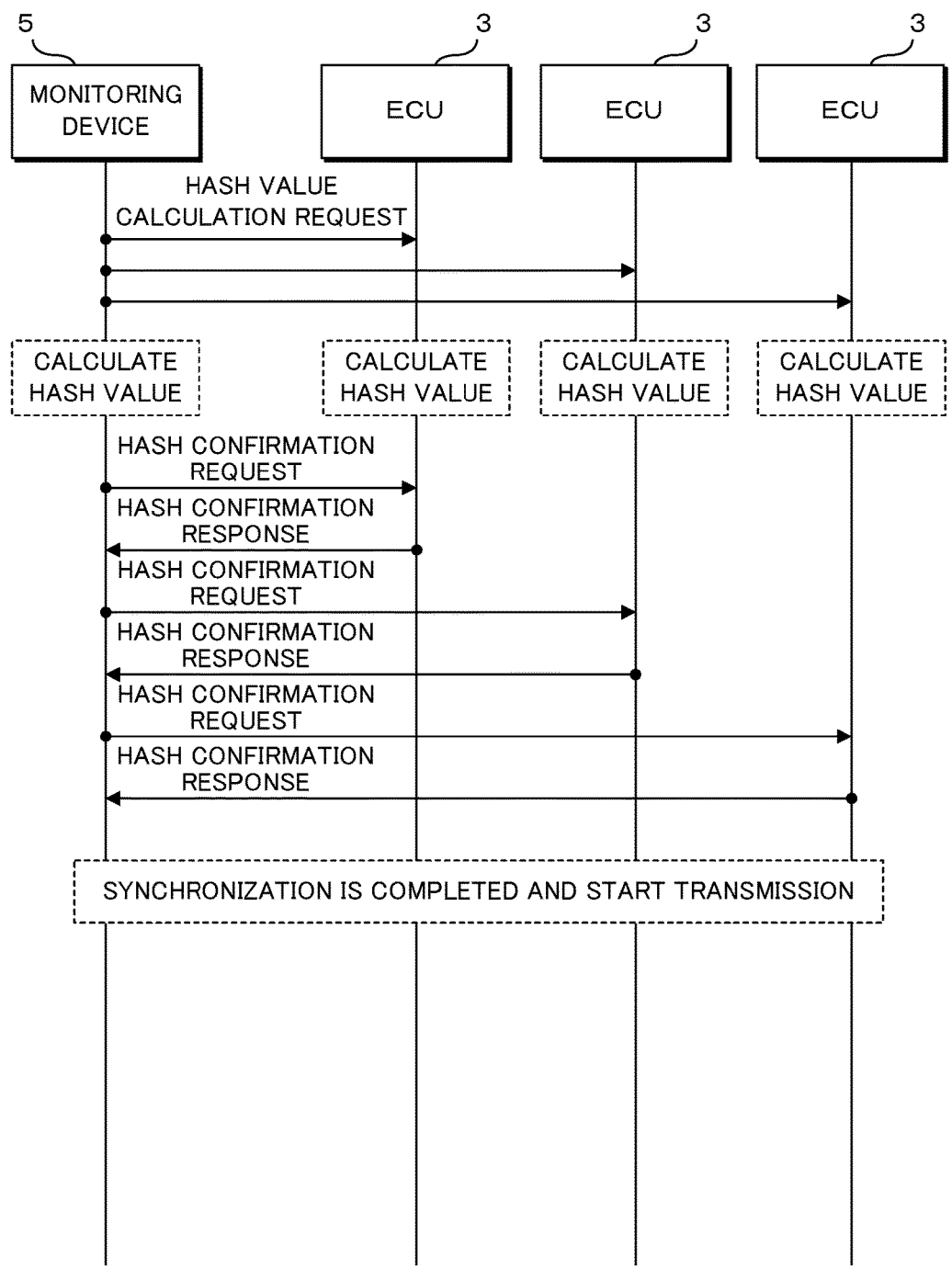
FIG. 14 is a schematic diagram for illustrating reference time point decision processing performed between the monitoring device and multiple ECUs.

In the communication system according to the present embodiment, multiple ECUs 3 are connected to the CAN bus, and it is thus necessary for the monitoring device 5 to perform reference time point decision processing with each of the ECUs 3. FIG. 14 is a schematic diagram for illustrating reference time point decision processing performed by the monitoring device 5 with multiple ECUs 3. While the reference time point decision processing is performed between the monitoring device 5 and three ECUs 3 in the present example, the monitoring device 5 similarly performs the reference time point decision processing also with less than or more than three ECUs 3.

The monitoring device 5 sequentially transmits a hash value calculation request including a random seed and region specifying information to each of the ECUs 3. Here, as for the random seed and region specifying information included in each hash value calculation request, a common value may be used or a different value may be set for each of the ECUs 3. Each of the ECUs 3 which received the hash value calculation request from the monitoring device 5 individually calculates a hash value based on the content stored in its own ROM 32. Moreover, the monitoring device 5 reads out the content stored in each ECU 3 from the copy data 52a in the storage unit 52, and calculates a hash value for each ECU 3.

The monitoring device 5 which finished the calculation of the hash value in each ECU 3 transmits a hash value confirmation request to any one of the ECUs 3, and receives a hash value confirmation response from the ECU 3. The monitoring device 5 determines whether or not the hash value included in the received hash value confirmation response is a correct one, and if the hash value is correct, decides the time point when the reception of the hash value confirmation response is completed as the reference time point t0 for this ECU 3.

Subsequently, the monitoring device 5 transmits a hash value confirmation request, receives a hash value confirmation response and decides a reference time point for a different one of the ECUs 3. Accordingly, the monitoring device 5 sequentially repeats transmission of a hash value confirmation request, reception of a hash value confirmation response and deciding of a reference time point for each of the ECUs 3 included in the communication system. After the reference time points are decided for all the ECUs 3, the monitoring device 5 starts monitoring the message transmission, and each ECU 3 starts transmission and reception of messages. The monitoring by the monitoring device 5 and the message transmission by the ECUs 3 may be started sequentially from the one with the reference time point decided.

Figure 15:
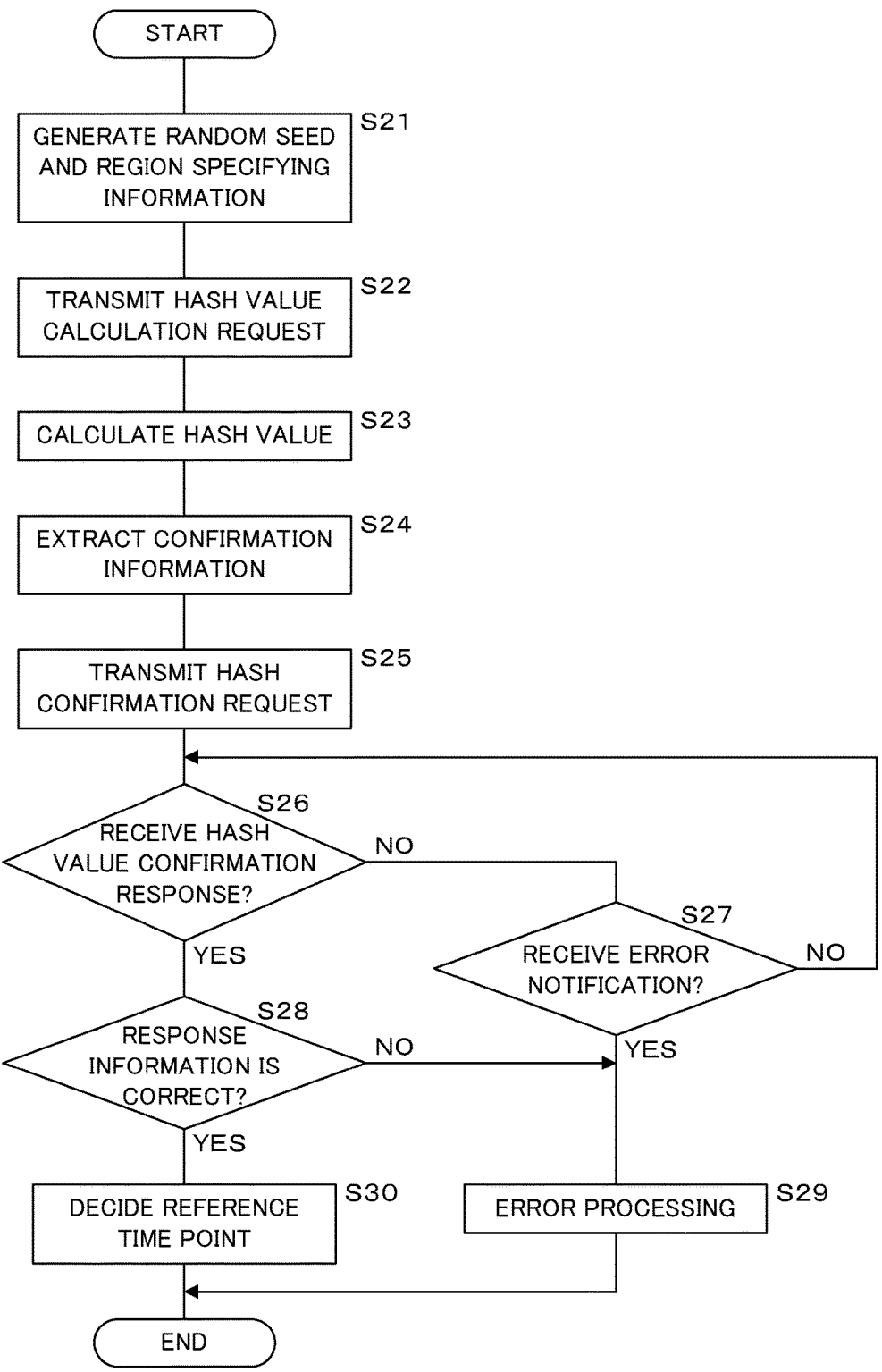
FIG. 15 is a flowchart illustrating the procedure of reference time point decision processing performed by the monitoring device.

FIG. 15 is a flowchart illustrating the procedure of reference time point decision processing performed by the monitoring device 5. The reference time point decision part 61 in the monitoring device 5 generates a random seed used for hash value calculation and region specifying information which specifies a storage region of the ROM 32 in the ECU 3 of a target for hash value calculation (step S21). The reference time point decision part 61 transmits a hash value calculation request including the generated random seed and region specifying information to the ECU 3 of a processing target through the CAN communication unit 53 (step S22).

The reference time point decision part 61 obtains the copy data 52*a* of the content stored in the ECU 3 of a processing target from the storage unit 52, and calculates a hash value using a predetermined hash function based on the obtained copy data 52*a* and the random seed as well as region specifying information generated at step S21 (step S23). The reference time point decision part 61 extracts a portion from the hash value calculated at step S23, as confirmation information (step S24). The reference time point decision part 61 transmits a hash confirmation request including the extracted confirmation information to the ECU 3 of a processing target through the CAN communication unit 53 (step S25).

Subsequently, the reference time point decision part 61 determines whether or not the hash value confirmation response transmitted by the ECU 3 in response to the hash value confirmation request is received by the CAN communication unit 53 (step S26). If the hash value confirmation response is not received (S26: NO), the reference time point decision part 61 determines whether or not an error notification is received from the ECU 3 of the processing target (step S27). If the error notification is not received (S27: NO), the reference time point decision part 61 returns the processing to step S26, and waits until the hash value confirmation response or error notification is received from the ECU 3.

If the hash value confirmation response is received from the ECU 3 of the processing target (S26: YES), the reference time point decision part 61 determines whether the response information is correct or not in accordance with whether the response information included in the received hash value confirmation response is included in the hash value calculated at step S23 (step S28). If the error notification is received from the ECU 3 (S27: YES), or if the response information received from the ECU 3 is not correct (S28: NO), the reference time point decision part 61 determines that the content stored in the ROM 32 of the target ECU 3 may have been altered, performs appropriate error processing by, for example, stopping the operation of the ECU 3 (step S29), and terminates the processing.

If the response information received from the ECU 3 is correct (S28: YES), the reference time point decision part 61 decides that the time point when the reception of the hash value confirmation response from the ECU 3 is completed is the reference time point (step S30), and terminates the processing.

Figure 16:
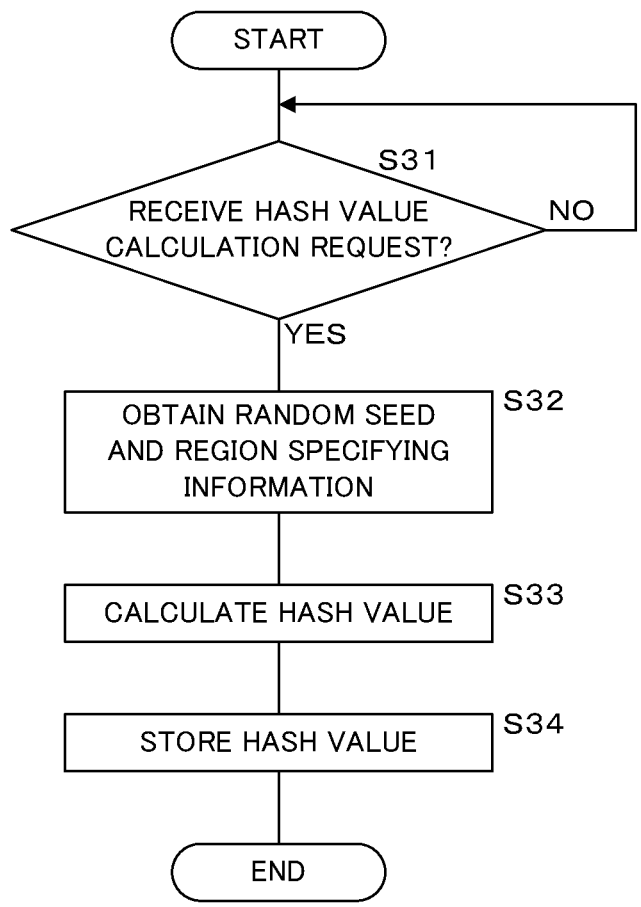
FIG. 16 is a flowchart illustrating a procedure of processing performed by an ECU according to a request for calculating a hash value from the monitoring device.

FIG. 16 is a flowchart illustrating a procedure of processing performed by an ECU according to a request for calculating a hash value from the monitoring device 5. The processing unit 31 of the ECU 3 determines whether or not a hash value calculation request is received at the CAN communication unit 34 from the monitoring device 5 (step S31). If the hash value calculation request is not received (S31: NO), the processing unit 31 waits until the hash value calculation request is received. If the hash value calculation request is received (S31: YES), the processing unit 31 obtains the random seed and region specifying information included in the received hash value calculation request (step S32). The hash value calculation part 42 of the processing unit 31 calculates a hash value using a predetermined hash function, based on the content stored in the ROM 32 and the random seed as well as region specifying information obtained at step S32 (step S33). The processing unit 31 stores the calculated hash value in the RAM 33 (step S34), and terminates the processing.

Figure 17:
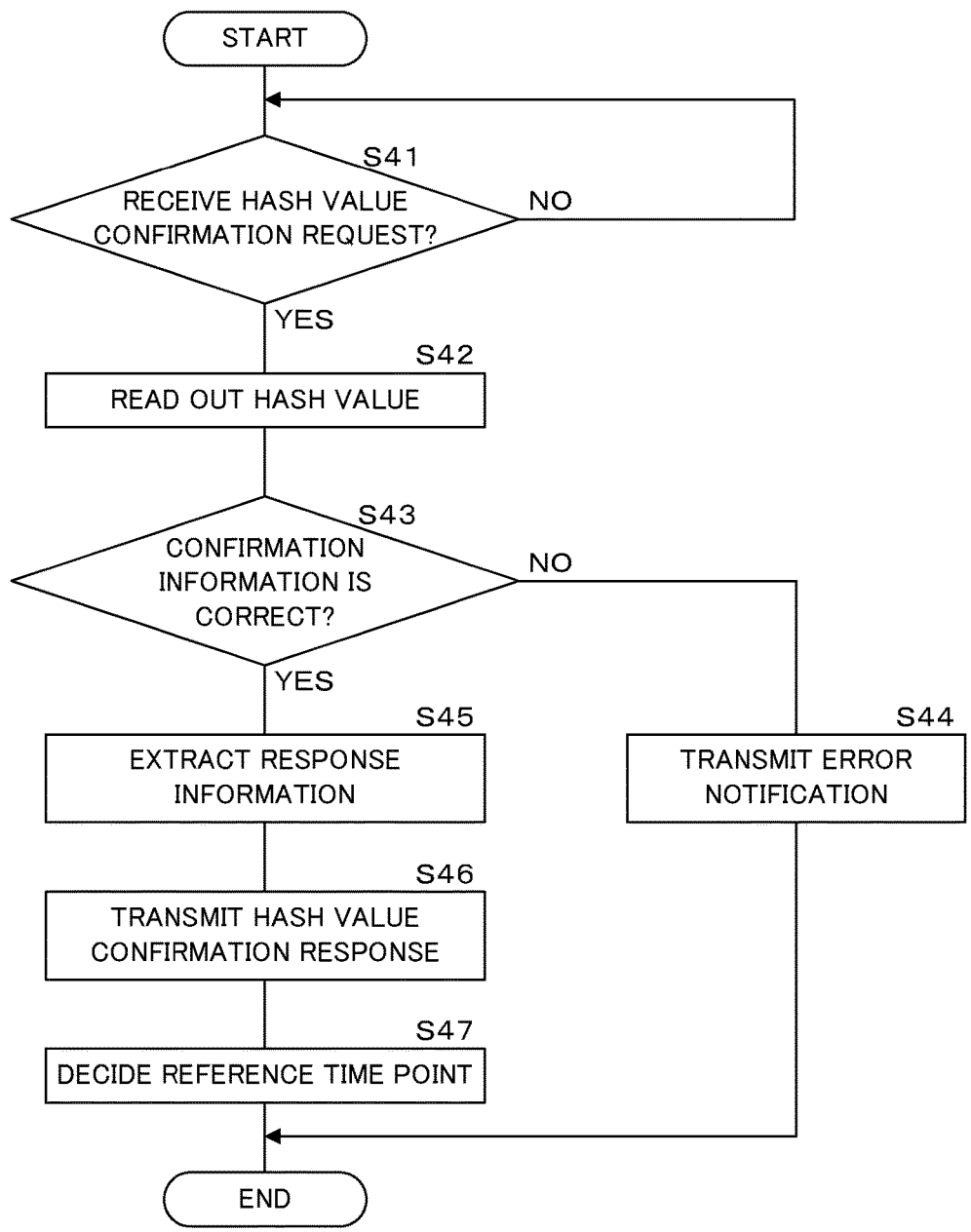
FIG. 17 is a flowchart illustrating a procedure of processing performed by an ECU according to a request for confirming a hash value from the monitoring device.

FIG. 17 is a flowchart illustrating a procedure of processing performed by the ECU 3 in response to a request for confirming a hash value from the monitoring device 5. The processing unit 31 of the ECU 3 determines whether or not a hash value confirmation request is received at the CAN communication unit 34 from the monitoring device 5 (step S41). If the hash value confirmation request is not received (S41: NO), the processing unit 31 waits until the hash value confirmation request is received. If the hash value confirmation request is received (S41: YES), the processing unit 31 reads out the hash value stored in the RAM 33 (step S42). The processing unit 31 determines if the confirmation information is correct or not in accordance with whether the confirmation information included in the hash value confirmation request received at step S41 is contained in the hash value read out at step S42 (step S43). If the confirmation information is not correct (S43: NO), the processing unit 31 transmits an error notification to the monitoring device 5 (step S44), and terminates the processing.

If the confirmation information from the monitoring device 5 is correct (S43: YES), the processing unit 31 extracts a portion with a predetermined length succeeding the confirmation information from the hash value read out at step S42, as response information (step S45). The processing unit 31 transmits the hash value confirmation response including the extracted response information to the monitoring device 5 through the CAN communication unit 34 (step S46). The processing unit 31 decides a time point when the transmission of the hash value confirmation response is completed as a reference time point (step S47), and terminates the processing.

While the communication system according to the present embodiment is configured to perform processing of deciding the reference time point at the time of activating the monitoring device 5 and ECU 3, the timing of the processing is not limited thereto. Moreover, in the case where, for example, a time lag or the like occurs in the timing for transmitting a message by the ECU 3, or the cycle of message transmission is changed, the processing of re-deciding the reference time point may be performed between the monitoring device 5 and the ECU 3.

In the case of re-deciding the reference time point, processing similar to the initial processing of deciding the reference time point as described above may be performed. That is, the monitoring device 5 may transmit a hash value calculation request and a hash value confirmation request, and in response thereto, the ECU 3 may transmit a hash value confirmation response to re-decide the reference time point. It may also be configured that the ECU 3 transmits a request for performing processing of re-deciding the reference time point to the monitoring device 5, and in response thereto, the monitoring device 5 starts the processing of deciding the reference time point.

Alternatively, the hash value obtained in the processing of deciding the reference time point may be stored, and the ECU 3 may transmit a request for re-deciding the reference time point including this hash value to the monitoring device 5. The monitoring device 5 which received the re-deciding request sets a time point when the reception of the re-deciding request is completed as a new reference time point if the hash value included in the re-deciding request is correct. The ECU 3 may set the time point when the transmission of the re-deciding request is completed as a new reference time point.

CONCLUSION

The communication system according to the present embodiment with the configuration described above is configured to include multiple ECUs 3 connected to a CAN bus and each of the ECUs periodically transmit messages, and is provided with the monitoring device 5 for detecting invalid message transmission. The monitoring device 5 decides the reference time point t0 for periodical message transmission by the ECU 3, decides multiple scheduled transmission time points t1=t0+T, t2=t0+2T, . . . obtained by adding a period corresponding to an integer multiple of the transmission cycle T of a message to the reference time point t0, and decides predetermined periods t1−A to t1+B, t2−A to t2+b, . . . including the respective scheduled transmission time points, as a permission period for message transmission.

Furthermore, the monitoring device 5 monitors the CAN bus to detect a message transmitted by the ECU 3. By determining whether or not the detected message has been transmitted during the permission period, the monitoring device 5 may determine whether or not this message is invalid and determine whether or not transmission of this message is to be permitted.

As described above, the monitoring device 5 according to the present embodiment is configured to decide a permission period for subsequent message transmission based on the reference time point t0 decided at the initial phase, i.e., configured to decide a permission period on an absolute basis. In contrast thereto, for example, such a configuration may also be employed that a time point obtained by adding the cycle T to the reception time point of the message is set as a scheduled transmission time point for the reception of each message to decide a permission period, i.e., that the permission period is decided on a relative basis. According to the CAN communication protocol, however, the arbitration processing is performed if collision occurs in message transmission, and thus a delay may be caused in the transmission of a message having a low priority level. In the configuration of making a decision on a relative basis, the permission period for determination varies if a delay is caused in message transmission. It is thus necessary to elongate the permission period to some extent, and therefore the permission period cannot easily be shortened. As the permission period is elongated, it is more possible to misjudge the validity of an invalid message. Moreover, in the configuration of making a decision on a relative basis, the permission period for the next message may be decided on the basis of the reception of an invalid message. In the case where such a situation occurs, it is possible that invalid messages are sequentially misjudged as valid messages. The monitoring device 5 according to the present embodiment is able to avoid the occurrence of these problems by deciding a permission period on the absolute basis.

Furthermore, the monitoring device 5 decides the reference time point t0 individually for each of the ECUs 3 included in the communication system. The monitoring device 5 decides the scheduled transmission time point to and the permission period with respect to the decided reference time point t0 for each of the ECUs 3. Accordingly, even if the communication system includes the ECUs 3 with different transmission cycles T, transmission timings and the like of messages, the monitoring device 5 may determine whether or not message transmission is permitted for each one of the ECUs 3.

Furthermore, an ECU 3 may transmit different types of messages with different transmission cycles, while the monitoring device 5 decides a permission period for each of the CAN-IDs of the messages. This allows the monitoring device 5 to determine the transmittability for each type of the messages even in the case where one ECU 3 transmits messages with different transmission cycles. While the reference time point t0 is decided for each ECU 3 in the present embodiment, it is not limited thereto but the reference time point t0 may also be decided for each CAN-ID. In such a case, the monitoring device 5 may perform the processing of deciding the reference time point multiple times (i.e., corresponding to the number of CAN-IDs assigned to the ECU 3) for one ECU 3.

Moreover, in the CAN communication protocol, the arbitration processing is performed if the transmission of multiple messages collide, and thus a delay may be caused in the transmission of a message. Here, the monitoring device 5 inspects whether or not a message has been transmitted in a period from the scheduled transmission time point to for a determination target message to the completion of transmission of the message. In the case where a message has been transmitted, the monitoring device 5 compares the priority level of the target message with the priority level of the transmitted message. If the priority level of the transmitted message is higher than the priority level of the target message, the target message is assumed to be delayed in its transmission due to the arbitration processing. Thus, the monitoring device 5 permits the transmission of the target message. In contrast, if the transmitted message has a priority level lower than that of the target message (except for the message transmitted before the permission period started), it is assumed that the delay of the target message is not due to the proper arbitration processing. Thus, the monitoring device 5 does not permit the transmission of the target message. Accordingly, even in the communication system where a delay is caused in message transmission due to arbitration processing, the monitoring device 5 may determine whether or not the message transmission is permitted.

Furthermore, the monitoring device 5 determines whether or not a message non-transmission period exceeding a predetermined length is present in a period from the scheduled transmission time point to for the target message to the completion of the transmission of the message. If a message non-transmission period is present, the monitoring device 5 does not permit transmission of the target message, because it is assumed that the delay of the target message is not caused by proper arbitration processing.

Moreover, in the communication system according to the present embodiment, a predetermined procedure is performed between the monitoring device 5 and the ECU 3 in order to decide the reference time point t0. The monitoring device 5 transmits a hash value calculation request to the ECU 3. Here, the monitoring device 5 sends a random seed and region specifying information necessary for hash value calculation to the ECU 3. The ECU 3 which received the hash value calculation request from the monitoring device 5 calculates a hash value using a predetermined hash function, based on the random seed as well as region specifying information included in the hash value calculation request and the data stored in the ROM 32. The ECU 3 transmits the hash value confirmation response including the calculated hash value to the monitoring device 5 in response to the hash value confirmation request from the monitoring device 5. The monitoring device 5 which received the hash value confirmation response from the ECU 3 determines whether or not the hash value included in the hash value confirmation response is correct. If the received hash value is correct, the monitoring device 5 decides the reference time point t0 based on the time point when the reception of the hash value confirmation response is completed. For example, the monitoring device 5 sets the time point when the reception of the hash value confirmation or the like is completed as the reference time point t0. However, the reference time point t0 is not limited thereto, but may be the transmission start point of the hash value confirmation response for example, or may be the time point obtained by adding or subtracting a predetermined period to/from the time point when the reception of the hash value confirmation response is completed, for example. In such a case, the ECU 3 decides the reference time point t0 based on the time point when transmission of the hash confirmation response including a correct hash value is completed, and transmits messages at the cycle T with the decided time point set as the reference. Since the reference time point t0 may be decided on the basis of the transmission and reception of highly reliable information based on a hash value, the monitoring device 5 may perform processing of detecting an invalid message with high reliability.

Furthermore, if determined that the transmission is not permitted for an invalid message, the monitoring device 5 performs the processing of causing the ECU 3 which is to receive the message to discard the message. For example, the monitoring device 5 may transmit an error frame to the CAN bus during the period of outputting the EOF in an invalid message, to cause the ECU 3 to discard the message. This can prevent the ECU 3 from receiving an invalid message and performing processing according to the message.

While the processing of deciding a reference time point, the processing of deciding a permission period, the processing of determining the transmittability, the processing of discarding an invalid message and so forth are performed by the processing unit 51 (so-called CPU or the like) of the monitoring device 5 in the present embodiment, it is not limited thereto, but these processing may also be performed by the CAN communication unit 53 (so-called CAN controller or the like). Likewise, the processing of deciding a reference time point such as the hash value calculation processing for the ECU 3 may be performed by the CAN communication unit 34, not by the processing unit 31.

Moreover, while the reference time point t0 is decided by exchanging information using a hash value between the monitoring device 5 and the ECU 3, the reference time point t0 may also be decided by a method not using a hash value. For example, information encrypted using a public key, secret key or the like may be transmitted and received between the monitoring device 5 and the ECU 3, and the reference time point t0 may be decided based on the result of the transmission and reception. The monitoring device 5 and the ECU 3 may perform highly reliable communication, to decide the reference time point t0 based on the result of the communication. Moreover, in the case where the monitoring device 5 and the ECU 3 have the time synchronization function, the reference time point t0 may be decided using the time synchronized by this function.

Moreover, while the monitoring device 5 is configured to store the copy data 52a obtained by copying the content stored in the ROM 32 of the ECU 3 in the storage unit 52, it is not limited thereto. For example, the copy data 52a may be stored in a different server device or the like, and the monitoring device 5 may obtain the copy data 52a from the server device as required. Furthermore, the server device may be provided with the hash value calculating function for the monitoring device 5 to obtain a required hash value from the server device. According to the present embodiment, while description is made to the communication system mounted to the vehicle 1, the communication system is not limited to the one mounted to the vehicle 1 but may also be a system mounted to a movable object such as an airplane or a vessel, or may be installed in a factory, an office, a school or the like, not in a movable object.

(Variation Example)

In the monitoring device 5 according to the embodiment described above, in the case where the message non-transmission period is not present in a period from the scheduled transmission time point to the message transmission, or where the message non-transmission period, even if present, is shorter than a predetermined length, the transmittability determination part 63 determines that the target message is a proper message and permits the transmission thereof. The monitoring device 5 according to Variation Example is configured to add the determination condition of the transmittability determination part 63 to the configuration of the monitoring device 5 as described above.

For example, in the case where two or more messages to be targets arrive within the transmission permission period, it is not possible to determine which one of the messages is a valid message. In the case where such a situation occurs frequently, any one of the messages may possibly be invalid. Therefore, if determined that two or more target messages have arrived within the transmission permission period, the transmittability determination part 63 in the monitoring device 5 according to the variation example does not permit the subsequent message transmission for all the messages. This allows the monitoring device 5 according to the variation example to prohibit transmission of a message that may be invalid.

The monitoring device 5 according to Variation Example may be configured, for example, to count the number of arrivals of two or more target messages within the transmission permission period, and if the number exceeds a predetermined number, to prohibit transmission of messages.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A communication control device controlling communication performed by a communication device having a message transmission circuit periodically transmitting messages, comprising:
    a reference time point decision circuit deciding a reference time point concerning message transmission by the message transmission circuit;
    a permission period decision circuit deciding a scheduled transmission time point by adding a period of an integral multiple of a message transmission cycle for messages transmitted by the message transmission circuit to the reference time point decided by the reference time point decision circuit, and deciding a predetermined period including the scheduled transmission time point as a permission period for message transmission;
    a message detection circuit detecting a message transmitted by the communication device;
    a transmittability determination circuit determining whether or not transmission of a message detected by the message detection circuit is to be permitted in accordance with whether or not the message is transmitted during the permission period decided by the permission period decision circuit; and
    a hash value request circuit sending a calculation request for a hash value to the communication device;
    a hash value reception circuit receiving a hash value transmitted by the communication device as a response to the calculation request; and
    a hash value determination circuit determining whether or not the hash value received by the hash value reception circuit is correct,
        wherein the reference time point decision circuit is further configured to decide the reference time point based on a time point when reception of a correct hash value from the communication device is completed.

2. The communication control device according to claim 1, wherein
    in a case where a plurality of communication devices to be controlled are present,
    the reference time point decision circuit and the permission period decision circuit are to decide the reference time point and the permission period for each of the plurality of communication devices.

3. The communication control device according to claim 1, wherein
    the message transmitted by the communication device includes information indicating a priority level of the message, and
    the permission period decision circuit is configured to decide the permission period for each priority level of the message.

4. The communication control device according to claim 3, comprising
    an arbitration unit arbitrating a transmission order according priority levels respectively determined for messages transmitted by a plurality of communication devices if the messages collide against each other,
    wherein the transmittability determination circuit is configured to inspect a priority level of a message completed to be transmitted in a period from the scheduled transmission time point related to a determination target message to completion of transmission of the determination target message, and to determine that transmission of the determination target message is not permitted if a message with a priority level lower than a priority level of the determination target message is present.

5. The communication control device according to claim 1, wherein
    the transmittability determination circuit is configured to determine, if a message non-transmission period exceeding a predetermined length is present in a period from the scheduled transmission time point related to a determination target message to completion of transmission of the determination target message, that transmission of the determination target message is not permitted.

6. The communication control device according to claim 1, comprising
    a discard processing circuit performing processing of causing the communication device, receiving a message determined by the transmittability determination circuit that transmission of the message is not permitted, to discard the message.

7. A communication system comprising a plurality of communication devices transmitting and receiving messages to/from each other, and a communication control device controlling communication performed by the communication devices, wherein:
    each communication device includes a message transmission circuit periodically transmitting messages, and
    the communication control device includes:
    a reference time point decision circuit deciding a reference time point concerning message transmission by the message transmission circuit;
    a permission period decision circuit deciding a scheduled transmission time point by adding a period of an integral multiple of a message transmission cycle for messages transmitted by the message transmission circuit to the reference time point decided by the reference time point decision circuit, and deciding a predetermined period including the scheduled transmission time point as a permission period for message transmission;
    a message detection circuit detecting the message transmitted by a communication device;
    a transmittability determination circuit determining whether or not transmission of a message detected by the message detection circuit is to be permitted in accordance with whether or not the message is transmitted during the permission period decided by the permission period decision circuit; and
    a hash value request circuit sending a calculation request for a hash value to the communication device;
    a hash value reception circuit receiving a hash value transmitted by the communication device as a response to the calculation request; and a hash value determination circuit determining whether or not the hash value received by the hash value reception circuit is correct, wherein the reference time point decision circuit is further configured to decide the reference time point based on a time point when reception of a correct hash value from the communication device is completed.

8. The communication system according to claim 7, wherein the reference time point decision circuit and the permission period decision circuit are configured to decide the reference time point and the permission period for each of the plurality of communication devices.

9. The communication system according to claim 7, wherein the message transmitted by the plurality of communication devices includes information indicating a priority level of the message, and the permission period decision circuit is configured to decide the permission period for each priority level of the message.

10. The communication system according to claim 9, comprising an arbitration unit arbitrating a transmission order according priority levels respectively determined for messages transmitted by the plurality of communication devices if the messages collide against each other, wherein the transmittability determination circuit is configured to inspect a priority level of a message completed to be transmitted in a period from the scheduled transmission time point related to a determination target message to completion of transmission of the determination target message, and to determine that transmission of the determination target message is not permitted if a message with a priority level lower than a priority level of the determination target message is present.

11. The communication system according to claim 7, wherein the transmittability determination circuit is configured to determine, if a message non-transmission period exceeding a predetermined length is present in a period from the scheduled transmission time point related to a determination target message to completion of transmission of the determination target message, that transmission of the determination target message is not permitted.

12. The communication system according to claim 7, wherein the communication control device includes:

a hash value calculation circuit calculating a hash value in accordance with a calculation request from the communication control device; and a hash value transmission circuit transmitting the hash value calculated by the hash value calculation circuit to the communication control device, and wherein the reference time point decision circuit is configured to decide the reference time point based on a time point when reception of a correct hash value from the communication device is completed.

13. The communication system according to claim 12, wherein the message transmission circuit is configured to decide a reference time point based on the time point when transmission of a correct hash value from the hash value transmission circuit is completed, and to periodically transmit messages with the decided time point set as a reference.

14. The communication system according to claim 7, wherein the communication control device includes a discard processing circuit performing processing of causing a communication device, receiving a message determined by the transmittability determination circuit that transmission of the message is not permitted, to discard the message.

* * * * *